United States Patent
Sato

(10) Patent No.: US 12,479,717 B2
(45) Date of Patent: Nov. 25, 2025

(54) SEMICONDUCTOR PRESSURE SENSOR AND MANUFACTURING METHOD OF SEMICONDUCTOR PRESSURE SENSOR

(71) Applicant: Mitsubishi Electric Corporation, Tokyo (JP)

(72) Inventor: Kimitoshi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 559 days.

(21) Appl. No.: 17/563,378

(22) Filed: Dec. 28, 2021

(65) Prior Publication Data

US 2022/0315415 A1 Oct. 6, 2022

(30) Foreign Application Priority Data

Apr. 1, 2021 (JP) .................. 2021-062762

(51) Int. Cl.
*B81B 7/00* (2006.01)
*G01L 9/00* (2006.01)
(52) U.S. Cl.
CPC .......... *B81B 7/0029* (2013.01); *G01L 9/0042* (2013.01); *G01L 9/0051* (2013.01); *B81B 2201/0264* (2013.01); *B81B 2203/0315* (2013.01)
(58) Field of Classification Search
CPC .......... B81B 7/0029; B81B 2201/0264; B81B 2203/0315; G01L 9/0042; G01L 9/0054; G01L 9/0045; G01B 7/18
See application file for complete search history.

(56) References Cited

U.S. PATENT DOCUMENTS

| | | | |
|---|---|---|---|
| 2015/0268113 A1 | 9/2015 | Takeuchi et al. | |
| 2016/0334292 A1* | 11/2016 | Oono | ............. H10D 48/50 |
| 2017/0113917 A1* | 4/2017 | Yoshikawa | ........... G01L 9/0048 |

(Continued)

FOREIGN PATENT DOCUMENTS

| | | |
|---|---|---|
| CN | 108896233 A | 11/2018 |
| JP | 2000-133817 A | 5/2000 |

(Continued)

OTHER PUBLICATIONS

An Office Action; "Notice of Reasons for Refusal," mailed by the Japanese Patent Office on Mar. 5, 2024, which corresponds to Japanese Patent Application No. 2021-062762 and is related to U.S. Appl. No. 17/563,378; with English language translation.

(Continued)

*Primary Examiner* — Fernando L Toledo
*Assistant Examiner* — Marshall Mu-Nuo Hatfield
(74) *Attorney, Agent, or Firm* — Studebaker Brackett PLLC

(57) ABSTRACT

A semiconductor pressure sensor includes: a first silicon substrate including a first recessed part; and a second silicon substrate including a diaphragm covering a first space in the first recessed part, the second silicon substrate being configured to hermetically seal the first space. In cross-section, a plurality of second spaces are hermetically sealed in a state of being separated away from the first space between the first silicon substrate and the second silicon substrate, and are provided in one of or each of a first end side and a second end side of the first space.

8 Claims, 24 Drawing Sheets

(56) References Cited

U.S. PATENT DOCUMENTS

| | | | |
|---|---|---|---|
| 2017/0305742 A1* | 10/2017 | Hayakawa | B81C 1/00357 |
| 2018/0120184 A1* | 5/2018 | Yoshikawa | B81B 7/0019 |
| 2018/0275001 A1* | 9/2018 | Tokuda | G01L 9/06 |
| 2019/0178739 A1* | 6/2019 | Yoshikawa | G01L 9/0042 |
| 2021/0039946 A1 | 2/2021 | Sakuragi | |

FOREIGN PATENT DOCUMENTS

| | | |
|---|---|---|
| JP | 2010-266425 A | 11/2010 |
| JP | 2015-184046 A | 10/2015 |
| JP | 2017-083187 A | 5/2017 |
| JP | 2021-025966 A | 2/2021 |

OTHER PUBLICATIONS

An Office Action mailed by China National Intellectual Property Administration on May 30, 2025, which corresponds to Chinese Patent Application No. 202210301280.4 and is related to U.S. Appl. No. 17/563,378; with English language translation.

An Office Action mailed by China National Intellectual Property Administration on Sep. 26, 2025, which corresponds to Chinese Patent Application No. 202210301280.4 and is related to U.S. Appl. No. 17/563,378; with English language translation.

\* cited by examiner

SEMICONDUCTOR PRESSURE SENSOR AND MANUFACTURING METHOD OF SEMICONDUCTOR PRESSURE SENSOR

BACKGROUND OF THE INVENTION

Field of the Invention

The present disclosure relates to a semiconductor pressure sensor, and a manufacturing method of a semiconductor pressure sensor.

Description of the Background Art

For example, as disclosed in Japanese Patent Application Laid-Open No. 2010-266425, a pressure sensor made of metal has been proposed. Further, for example, as disclosed in Japanese Patent Application Laid-Open No. 2015-184046, a semiconductor pressure sensor made of a semiconductor has been proposed.

In some semiconductor pressure sensors, when a pressure of a permeation gas having high permeability, such as a hydrogen gas, is detected, the permeation gas may permeate into the semiconductor pressure sensor, causing variation in characteristics of the semiconductor pressure sensor.

SUMMARY

The present disclosure is made in view of the problem as described above, and has an object to provide a technology that can reduce variation in characteristics of a semiconductor pressure sensor.

A semiconductor pressure sensor according to the present disclosure includes: a first silicon substrate including a first recessed part; a second silicon substrate including a diaphragm covering a first space in the first recessed part, the second silicon substrate being configured to hermetically seal the first space; and a gauge resistance configured to output a deformation amount of the diaphragm by using electrical characteristics. In cross-section, a plurality of second spaces are hermetically sealed in a state of being separated away from the first space between the first silicon substrate and the second silicon substrate, and are provided in one of or each of a first end side and a second end side of the first space.

Variation in characteristics of a semiconductor pressure sensor can be reduced.

These and other objects, features, aspects and advantages of the present disclosure will become more apparent from the following detailed description of the present disclosure when taken in conjunction with the accompanying drawings.

DESCRIPTION OF THE PREFERRED EMBODIMENTS

Embodiments will be described below with reference to the accompanying drawings. Features described in each embodiment below are examples, and not all the features are necessarily needed. Further, in the description illustrated below, similar constituent elements in a plurality of embodiments are denoted by the same or similar reference signs, and different constituent elements will mainly be described. Further, in the description illustrated below, specific positions and directions, such as "up", "down", "left", "right", "front", or "back", need not necessarily match the positions and directions used in actual implementation. Further, a state in which a certain part has concentration higher than another part means that, for example, the average concentration of the certain part is higher than the average concentration of the another part. Conversely, a state in which a certain part has concentration lower than another part means that, for example, the average concentration of the certain part is lower than the average concentration of the another part.

First Embodiment

Figure 1:
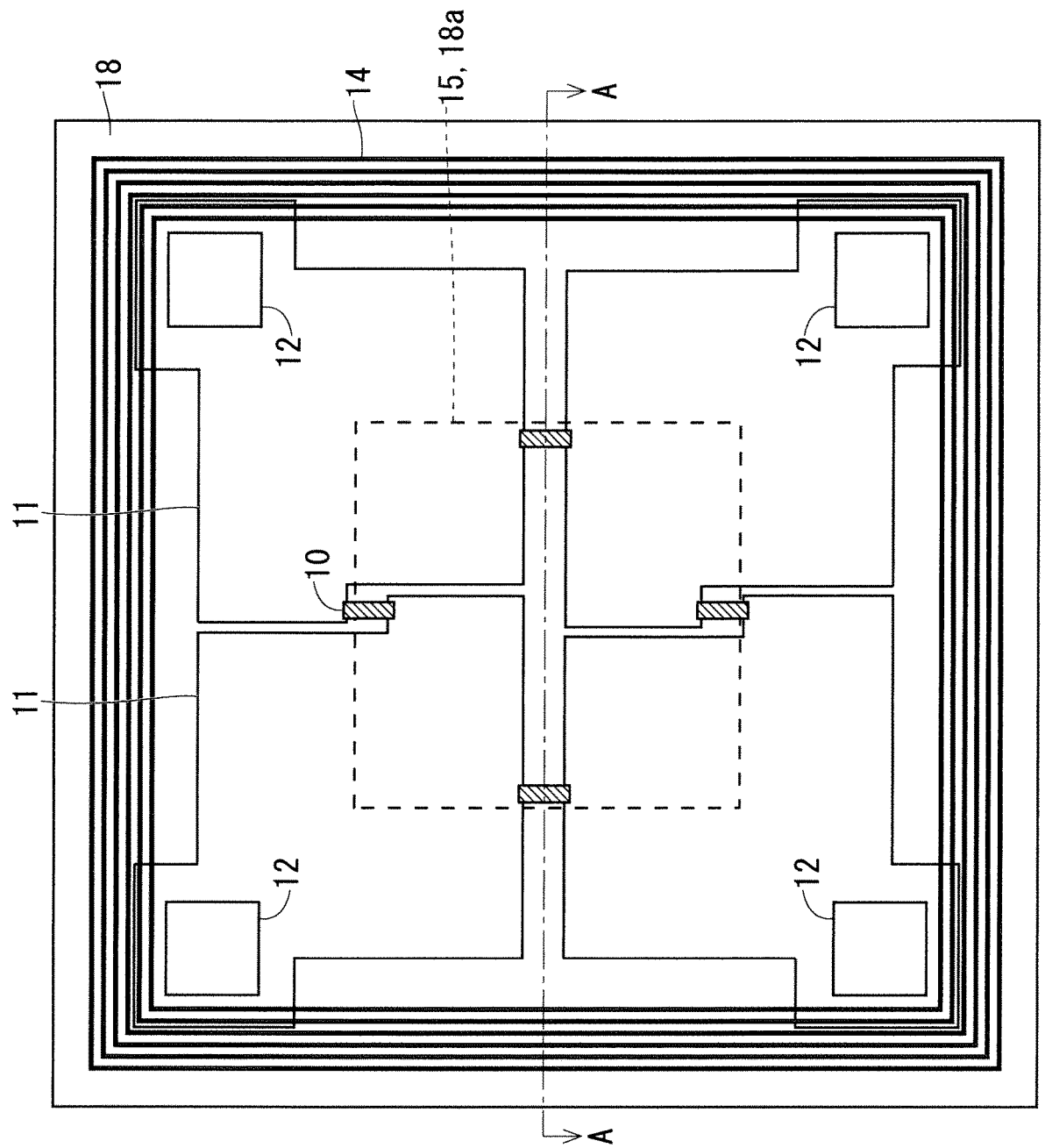
FIG. 1 is a plan view illustrating a configuration of a semiconductor pressure sensor according to the first embodiment.
Figure 2:
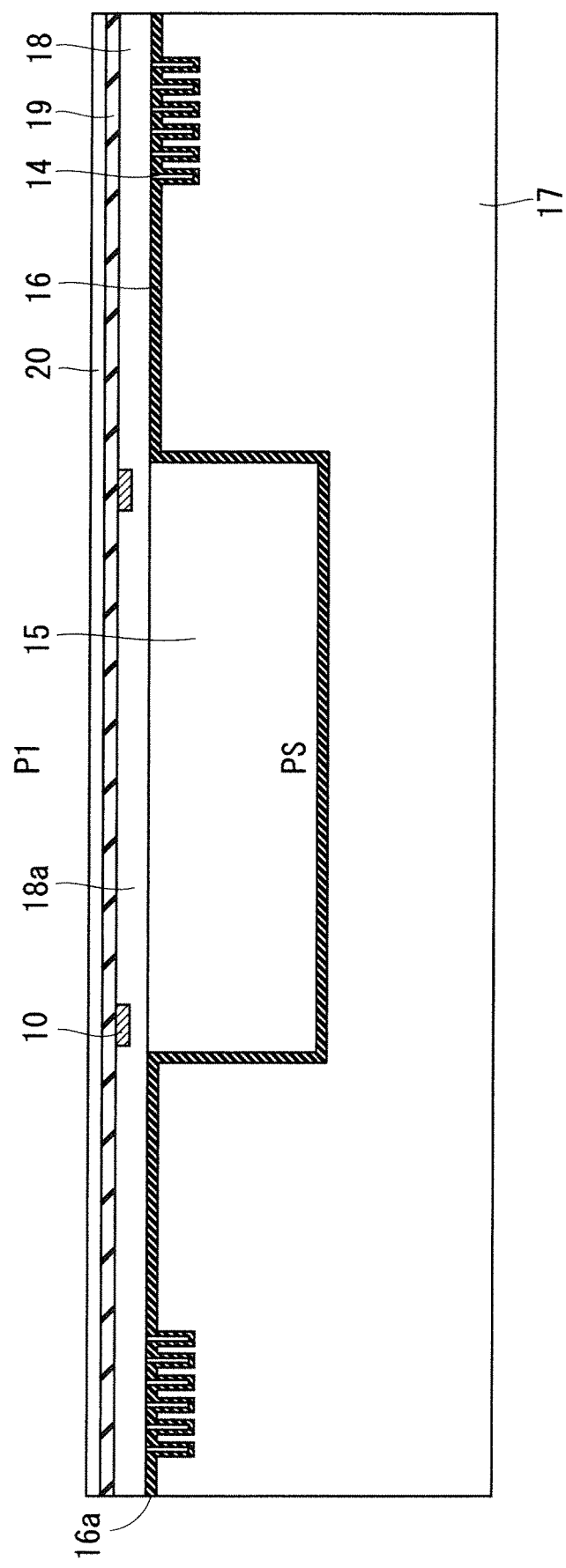
FIG. 2 is a cross-sectional diagram illustrating of a configuration of the semiconductor pressure sensor according to the first embodiment.

FIG. 1 is a plan view illustrating a configuration of a semiconductor pressure sensor according to the first embodiment. FIG. 2 is a cross-sectional diagram taken along the line A-A of FIG. 1. The semiconductor pressure sensor includes, as illustrated in FIG. 2, a diaphragm 18a that is deformed due to a pressure difference between an external pressure P1 applied to the upper surface of the second silicon substrate 18 and a vacuum pressure PS inside a pressure reference chamber 15 being a vacuum chamber. The semiconductor pressure sensor further includes gauge resistances 10 that output an electrical signal corresponding to a deformation amount of the diaphragm 18a, i.e., output the deformation amount of the diaphragm 18a by using electrical characteristics.

The semiconductor pressure sensor according to the first embodiment mainly includes the gauge resistances 10, a first silicon oxide film 16 being a silicon oxide film, a first silicon substrate 17, and a second silicon substrate 18. In the following, these constituent elements and constituent elements associated with those will be described.

The first silicon substrate 17 has a conductivity type of one of a first conductivity type (n type) and a second conductivity type (p type). The first silicon substrate 17 is a base silicon substrate required to have certain strength, and thus has a thickness of approximately 200 to 900 μm, for example.

The second silicon substrate 18 has a conductivity type of the first conductivity type (n type). A part of the second silicon substrate 18 serves as the deformable diaphragm 18a, and thus the second silicon substrate 18 has a thickness of approximately 5 to 30 μm, for example.

As illustrated in FIG. 2, the first silicon oxide film 16 is connected to the first silicon substrate 17 and the second silicon substrate 18, and joins the first silicon substrate 17 and the second silicon substrate 18 to each other. The first silicon oxide film 16 has a thickness of approximately 0.1 to 5 μm, for example.

The first silicon substrate 17 includes a first recessed part. With a first space in the first recessed part being hermetically sealed by the second silicon substrate 18, the pressure reference chamber 15 corresponding to the first space is provided.

Figure 3:
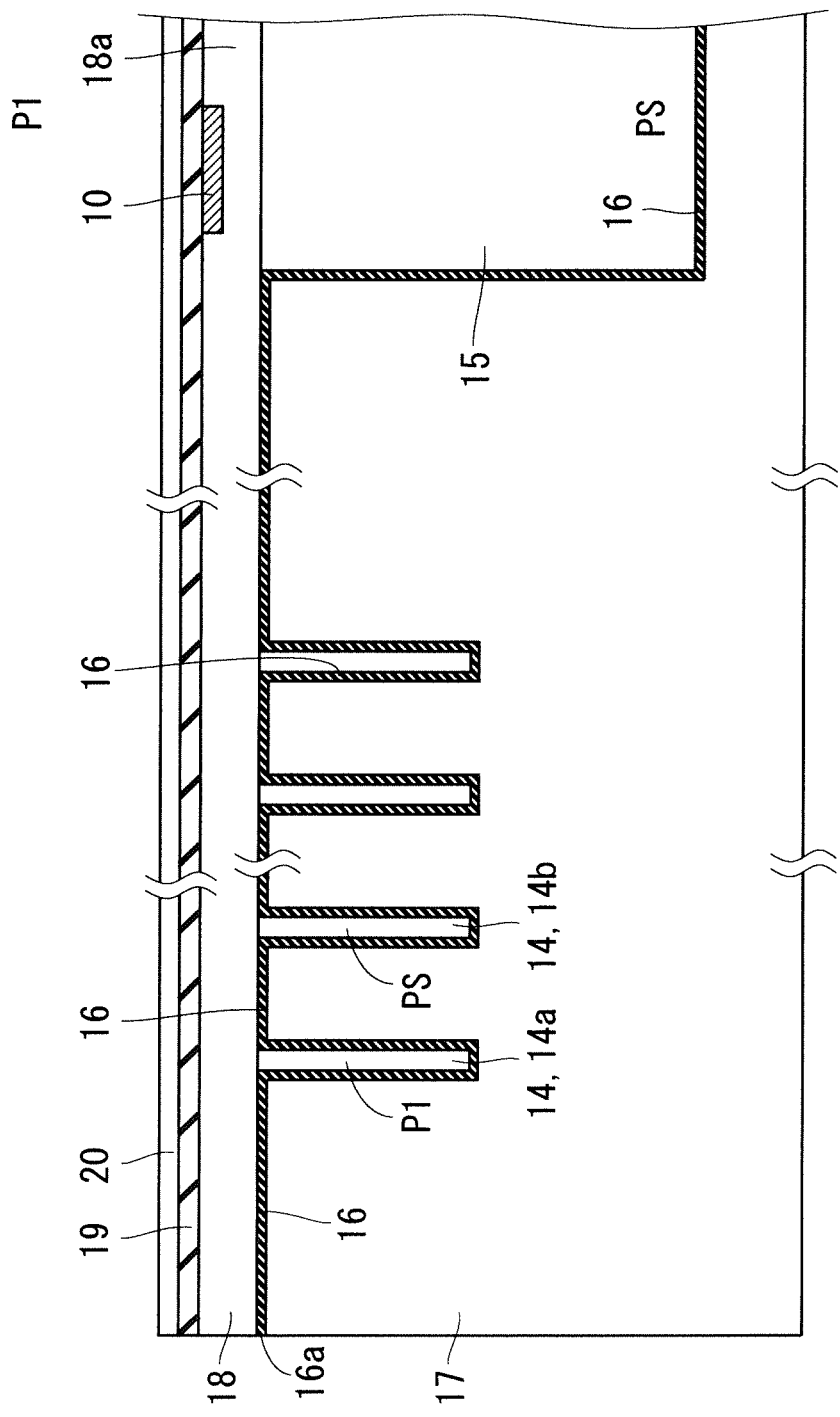
FIG. 3 is a cross-sectional diagram illustrating a part of the configuration of the semiconductor pressure sensor according to the first embodiment.
Figure 4:
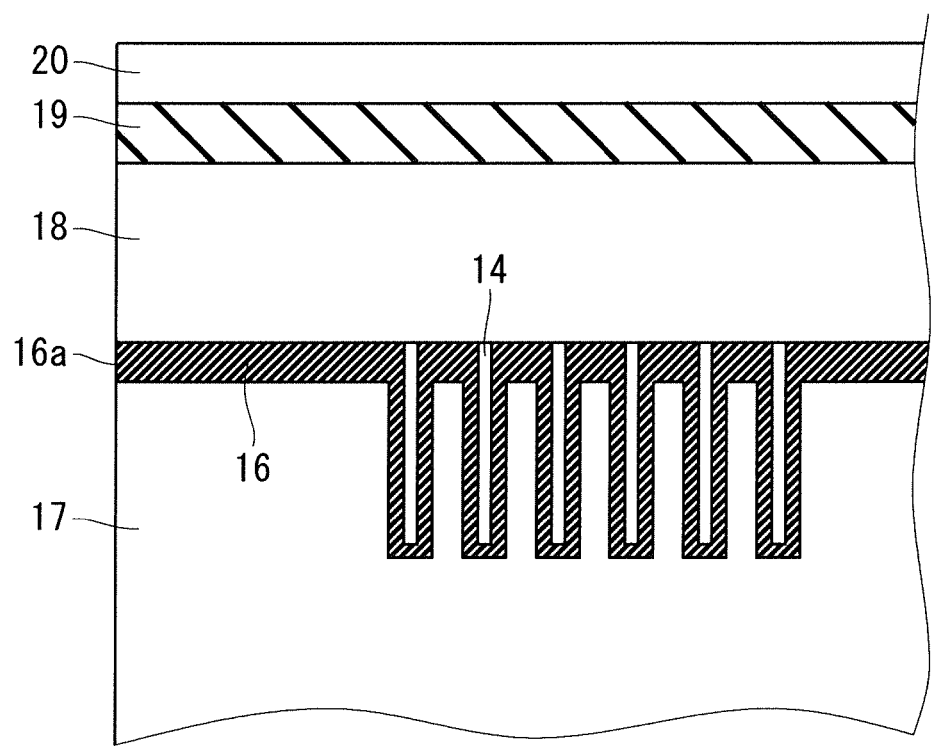
FIG. 4 is a cross-sectional diagram schematically illustrating a part of the configuration of the semiconductor pressure sensor according to the first embodiment.

FIG. 3 is an enlarged cross-sectional diagram of a left end portion of FIG. 2. FIG. 4 is a cross-sectional diagram schematically illustrating a cross-sectional configuration of FIG. 3. As illustrated in FIG. 3 and FIG. 4, the first silicon substrate 17 includes a plurality of second recessed parts surrounding a plurality of second spaces. In cross-section, with the plurality of second spaces being hermetically sealed in a state of being separated away from the pressure reference chamber 15 between the first silicon substrate 17 and the second silicon substrate 18, a plurality of permeation gas stagnation chambers 14 corresponding to the plurality of second spaces are provided.

Note that, in the example of FIG. 3, the plurality of permeation gas stagnation chambers 14 are provided on both of the right end side and the left end side of the pressure reference chamber 15. However, this is not restrictive, and the plurality of permeation gas stagnation chambers 14 may be provided on either one of the right end side and the left end side of the pressure reference chamber 15. Further, in the examples of FIG. 3 and FIG. 4, the first silicon oxide film 16 is provided not only between the first silicon substrate 17 and the second silicon substrate 18 but also on the side surface and the bottom surface of the plurality of permeation gas stagnation chambers 14.

In FIG. 1, the plurality of permeation gas stagnation chambers 14 are shown in bold lines for the sake of convenience of the drawings. In the example of the plan view of FIG. 1, the plurality of permeation gas stagnation chambers 14 are disposed in a concentric pattern about the pressure reference chamber 15, and each of the plurality of permeation gas stagnation chambers 14 extends along the circumferential direction of the concentric pattern without interruptions.

A part of the second silicon substrate 18 covering the pressure reference chamber 15 serves as the diaphragm 18a. Specifically, the first recessed part of the first silicon substrate 17 is a cavity, and a part of the second silicon substrate 18 above the cavity serves as the diaphragm 18a. The diaphragm 18a is deformed by an amount corresponding to a pressure difference (P1-PS), which is a difference between the external pressure P1 applied to the upper surface of the diaphragm 18a and the vacuum pressure PS inside the pressure reference chamber 15 being a vacuum chamber. The pressure applied to the upper surface of the diaphragm 18a is higher than the pressure inside the pressure reference chamber 15, and thus the diaphragm 18a is deformed in a manner of projecting toward the first silicon substrate 17 side.

On the upper surface of the diaphragm 18a of the second silicon substrate 18 having the first conductivity type (n type), for example, the gauge resistances 10 having the second conductivity type (p type) are disposed by means of ion implantation or the like. In the example of FIG. 1, four gauge resistances 10 are respectively disposed on the four sides of the diaphragm 18a. The gauge resistances 10 are connected to diffusion wires 11 having the same conductivity type as that of the gauge resistances 10. In the example of FIG. 1, one end and another end of the four gauge resistances 10 are connected without overlapping two combinations among four diffusion wires 11, in such a manner that a Wheatstone bridge is configured.

To the gauge resistances 10 disposed on the diaphragm 18a, a stress in accordance with the deformation amount of the diaphragm 18a is applied from the diaphragm 18a deformed due to the pressure difference (P1-PS). The resistance value of the gauge resistances 10 changes in proportion to the magnitude of the applied stress, and thus by connecting the gauge resistances 10 to the Wheatstone bridge, the semiconductor pressure sensor generates an output voltage indicating resistance value change of the gauge resistances 10, and further the pressure difference (P1-PS). The output voltage is transmitted from an electrode 12 disposed on each diffusion wire 11 to the outside.

Note that the above describes an example in which the second silicon substrate 18 has the first conductivity type (n type), and the gauge resistances 10 have the second conductivity type (p type). However, the second silicon substrate 18 may have the second conductivity type (p type), and the gauge resistances 10 may have the first conductivity type (n type). Note that, in this case, disposition positions of the gauge resistances 10 in the diaphragm 18a need to be changed from the disposition positions of FIG. 1.

Since the change of the resistance value of the diffusion wires 11 due to a stress caused in the diaphragm 18a is preferably small, and further, the diffusion wires 11 are used as wires for enabling Wheatstone bridge connection of the gauge resistances 10, the diffusion wires 11 need to have low resistance. For this reason, diffusion surface concentration of impurity of the diffusion wires 11 is set to approximately 1e19 to 1e20 ions/cm$^3$, for example, and diffusion depth thereof is set to approximately 2 to 5 µm, for example.

On the other hand, the change of the resistance value of the gauge resistances 10 due to a stress caused in the diaphragm 18a is preferably large. In view of the above as well as temperature characteristics of each element, diffusion surface concentration of impurity of the gauge resistances 10 is set to approximately 5e17 to 5e18 ions/cm$^3$, for example, and diffusion depth thereof is set to approximately 0.5 to 1.5 µm, for example.

On the diaphragm 18a, a second silicon oxide film 19 and a protective film 20 are provided in this order.

Next, detection of the pressure difference (P1-PS) of the diaphragm 18a will be described. When the first silicon substrate 17 and the second silicon substrate 18 are attached together, the pressure reference chamber 15 being a vacuum chamber is formed from the first recessed part provided at the center of the first silicon substrate 17, i.e., the center of a pressure sensor chip. The pressure in the pressure reference chamber 15 is the vacuum pressure PS, and serves as a reference pressure for the external pressure P1 applied to the upper surface of the diaphragm 18a. With this, the semiconductor pressure sensor functions as an absolute pressure sensor.

When the first silicon substrate 17 having the first recessed part is attached and joined to the second silicon substrate 18 with the first silicon oxide film 16 being interposed therebetween, a cavity SOI substrate is formed. When the cavity being the first recessed part forms the pressure reference chamber 15, and a part of the second silicon substrate 18 above the pressure reference chamber 15 serves as the diaphragm 18a, the semiconductor pressure sensor is enabled to detect the pressure difference (P1-PS) between the external pressure P1 and the vacuum pressure PS.

Note that detection sensitivity with respect to pressure change can be controlled by the thickness of the diaphragm 18a that can be set by the thickness of the second silicon substrate 18, and the area of the first recessed part of the first silicon substrate 17 in plan view, i.e., the area of the diaphragm 18a above the cavity.

Next, the permeation gas stagnation chambers 14 disposed at an outer peripheral part of the pressure sensor chip will be described. The external pressure P1 is applied not only to the diaphragm 18a but also to the entire chip of the semiconductor pressure sensor. Thus, in pressure detection of a permeation gas having high permeability such as a hydrogen gas in particular, a permeating hydrogen gas may permeate to the pressure reference chamber 15 through a portion between the first silicon substrate 17 and the second silicon substrate 18 and cause variation in the reference pressure. In this case, this may cause variation in characteristics of the semiconductor pressure sensor.

The permeation of the hydrogen gas to the pressure reference chamber 15 will be described in detail. First, as illustrated in FIG. 3 and FIG. 4, (i) hydrogen adsorbs to an exposed part 16a of the first silicon oxide film 16 from gas phase. Next, (ii) the hydrogen in the adsorbed state is absorbed into the first silicon oxide film 16 so as to be movable in a solid solution state, (iii) after reaching the pressure reference chamber 15, atoms in the solid solution state return to the adsorbed state, and (iv) return from the adsorbed state to the gas phase. With this, the hydrogen gas enters the pressure reference chamber 15, and characteristics of the semiconductor pressure sensor vary. Note that permeation of the permeation gas in the first silicon substrate 17 and the second silicon substrate 18 is sufficiently slower than the permeation of the permeation gas in the first silicon oxide film 16, and thus does not cause a problem.

In view of the above, in the first embodiment, in cross-section, the plurality of permeation gas stagnation chambers 14 are provided in a state of being separated away from the pressure reference chamber 15 between the first silicon substrate 17 and the second silicon substrate 18. According to the configuration as described above, processes of (i) to (iv) above is repeated as many times as the number of permeation gas stagnation chambers 14 disposed in the semiconductor pressure sensor. Therefore, permeation speed of hydrogen can be made substantially slow.

Further, permeation speed of hydrogen is in proportion to the pressure difference (P1-PS). The original pressure of the outermost permeation gas stagnation chamber 14a and the original pressure of the second outermost permeation gas stagnation chamber 14b are the vacuum pressure PS, similarly to the pressure of the pressure reference chamber 15. Although the pressure of the outermost permeation gas stagnation chamber 14a rises due to permeation from the exposed part 16a, it takes time to reach the external pressure P1. Thus, from this perspective as well, the permeation speed of hydrogen from the outermost permeation gas stagnation chamber 14a to the second outermost permeation gas stagnation chamber 14b is made slow.

From the above, the permeation gas such as a hydrogen gas can be inhibited from permeating to the pressure reference chamber 15, and therefore reliability of the semiconductor pressure sensor with respect to the permeation gas can be enhanced. Note that, in order to reduce characteristics variation due to hydrogen gas permeation, a configuration of simply increasing the length of the distance from the pressure reference chamber 15 to the exposed part 16a is conceivable. With this configuration, however, the chip size is increased. In contrast, according to the configuration of the first embodiment, the chip size can be made less liable to be increased, and accordingly, costs can be made less liable to be increased.

The outermost permeation gas stagnation chamber 14a is disposed at a position away from the exposed part 16a by 30 µm or more, for example. Further, the widths of the permeation gas stagnation chambers 14 may be equal to each other or may be different from each other. The width of each permeation gas stagnation chamber 14 is set to several tens of micrometers or less, for example. When the widths of the permeation gas stagnation chambers 14 are set large, the speed that the pressure of the permeation gas stagnation chambers 14 changes from the vacuum pressure PS to the external pressure P1 due to hydrogen gas permeation can be reduced, but the chip size is increased. Thus, in order to make the chip size less liable to be increased, it is preferable that the lower ends of the permeation gas stagnation chambers 14 be located below the lower end of the pressure reference chamber 15 by, for example, setting the width of each permeation gas stagnation chamber 14 to several micrometers and setting the depth thereof to approximately 50 to 400 μm, for example.

Figure 5:
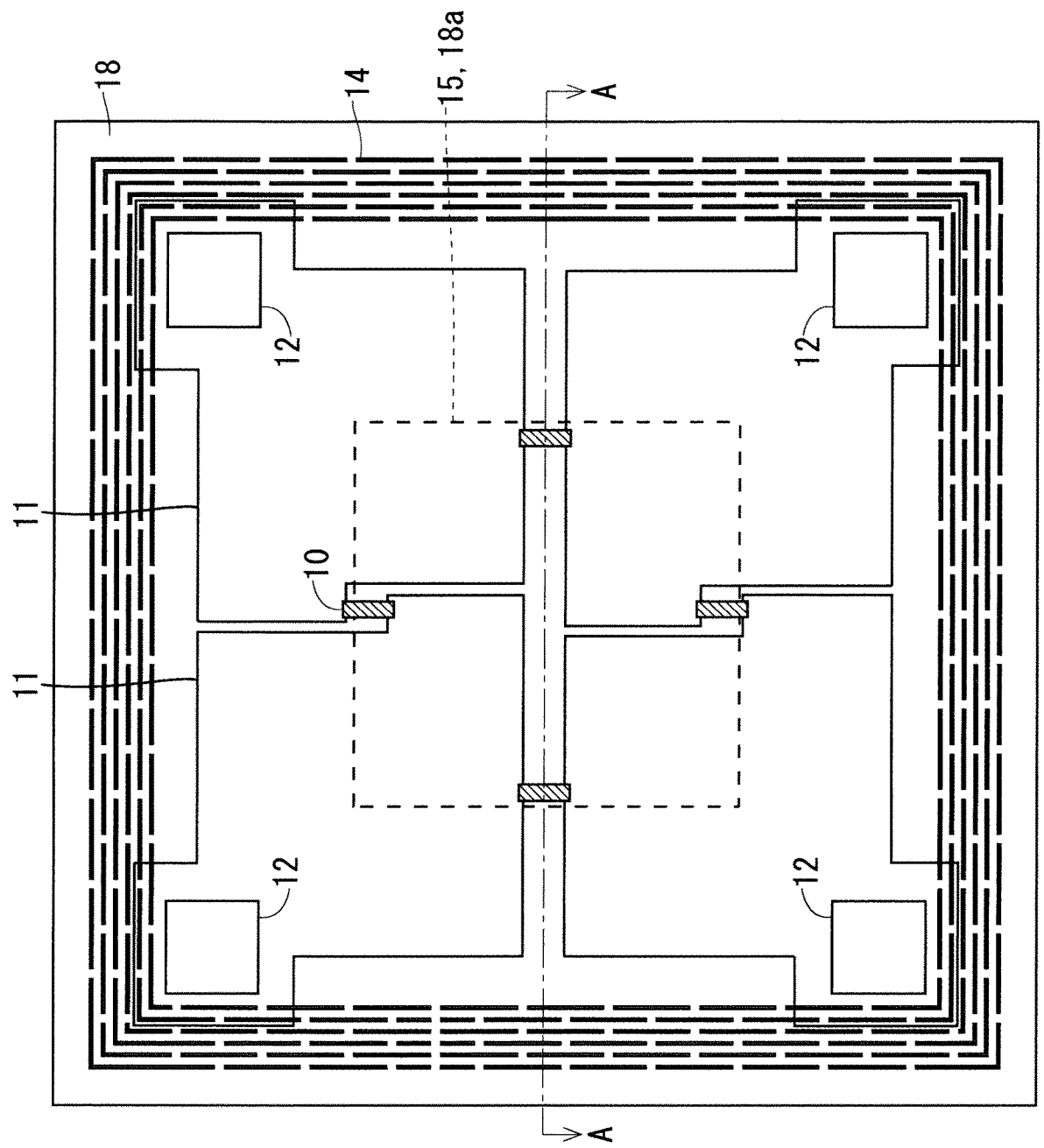
FIG. 5 is a plan view illustrating another example of a configuration of the semiconductor pressure sensor according to the first embodiment.

Note that, in the example of FIG. 1, each of the plurality of permeation gas stagnation chambers 14 extends along the circumferential direction of the concentric pattern without interruptions. However, this is not restrictive. For example, as illustrated in FIG. 5, each of the plurality of permeation gas stagnation chambers 14 may be discontinuously disposed along the circumferential direction of the concentric pattern. Among the concentric circles, discontinuous parts of the plurality of permeation gas stagnation chambers 14 in a first circle and discontinuous parts of the plurality of permeation gas stagnation chambers 14 in a second circle adjacent to the first circle may be alternately disposed along the circumferential direction. In other words, the discontinuous parts of the plurality of permeation gas stagnation chambers 14 may be disposed in a lattice patter at different levels. Note that the cross-sectional diagram taken along the line A-A of FIG. 5 is similar to FIG. 2 and FIG. 3.

According to the configuration as in FIG. 5, between the exposed part 16*a* of the first silicon oxide film 16 and the pressure reference chamber 15, a part in which the first silicon oxide film 16 to serve as a gas permeation path is continuously connected may exist. However, owing to the permeation gas stagnation chambers 14, a path following the first silicon oxide film 16 from the exposed part 16*a* to the pressure reference chamber 15 is extended longer, and thus the permeation gas such as a hydrogen gas can be inhibited from permeating to the pressure reference chamber 15. Further, the joining area between the first silicon substrate 17 and the second silicon substrate 18 due to the first silicon oxide film 16 can be increased, and thus joining strength can be maintained.

Next, in cross-section, another example of a configuration of the plurality of permeation gas stagnation chambers 14 will be described.

Figure 6:
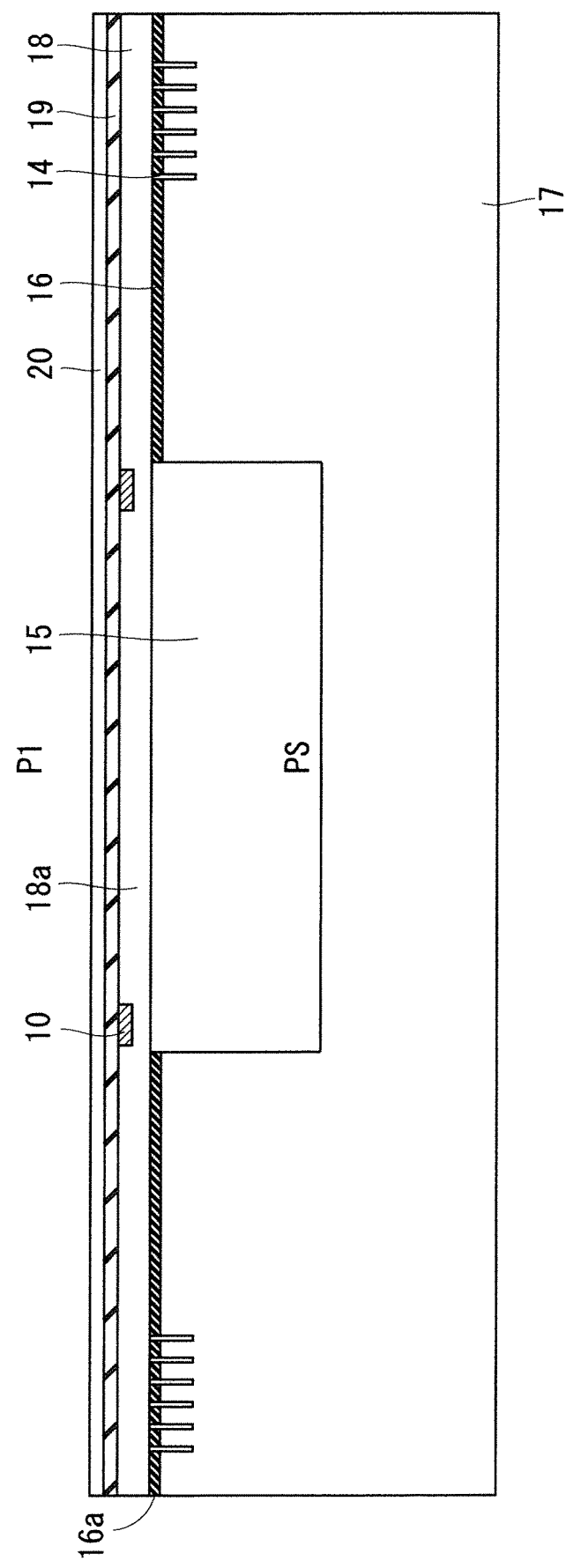
FIG. 6 is a cross-sectional diagram illustrating a part of another example of the configuration of the semiconductor pressure sensor according to the first embodiment.
Figure 7:
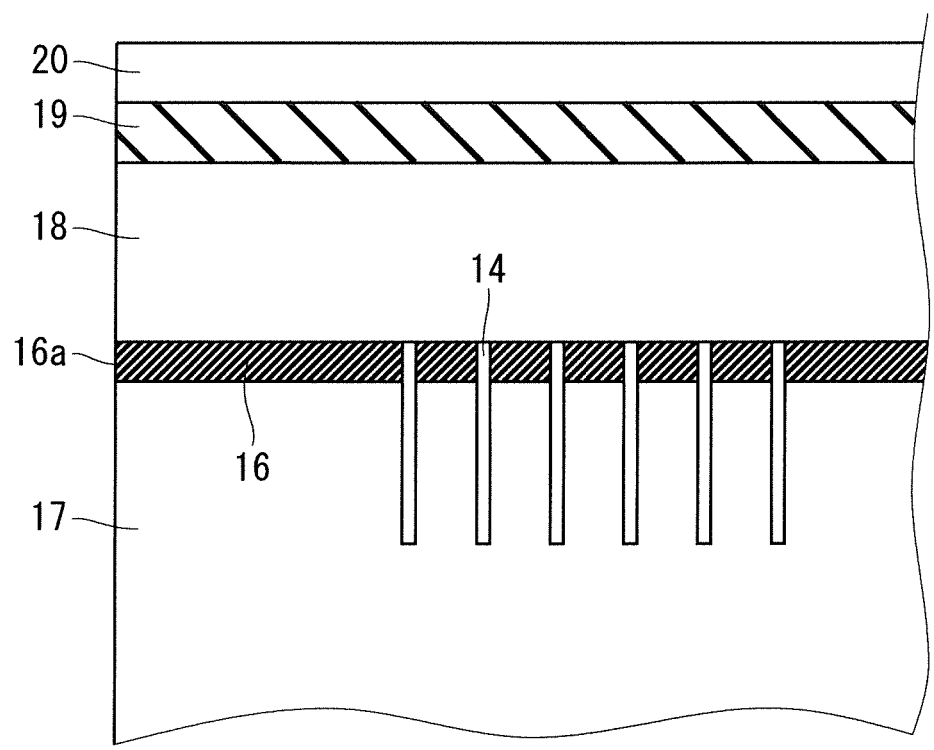
FIG. 7 is a cross-sectional diagram schematically illustrating a part of another example of the configuration of the semiconductor pressure sensor according to the first embodiment.

FIG. 6 is a cross-sectional diagram similar to FIG. 2. FIG. 7 is a cross-sectional diagram similar to FIG. 4, schematically illustrating a cross-sectional configuration of FIG. 6. In the examples of FIG. 6 and FIG. 7, unlike the examples of FIG. 2 and FIG. 4, the first silicon oxide film 16 is not provided on the side surface and the bottom surface of the plurality of permeation gas stagnation chambers 14, but is provided only at a joining part between the first silicon substrate 17 and the second silicon substrate 18. According to the configuration as described above, the first silicon oxide film 16 to serve as a gas permeation path is divided, and thus the permeation gas such as a hydrogen gas can be inhibited from permeating to the pressure reference chamber 15.

Figure 8:
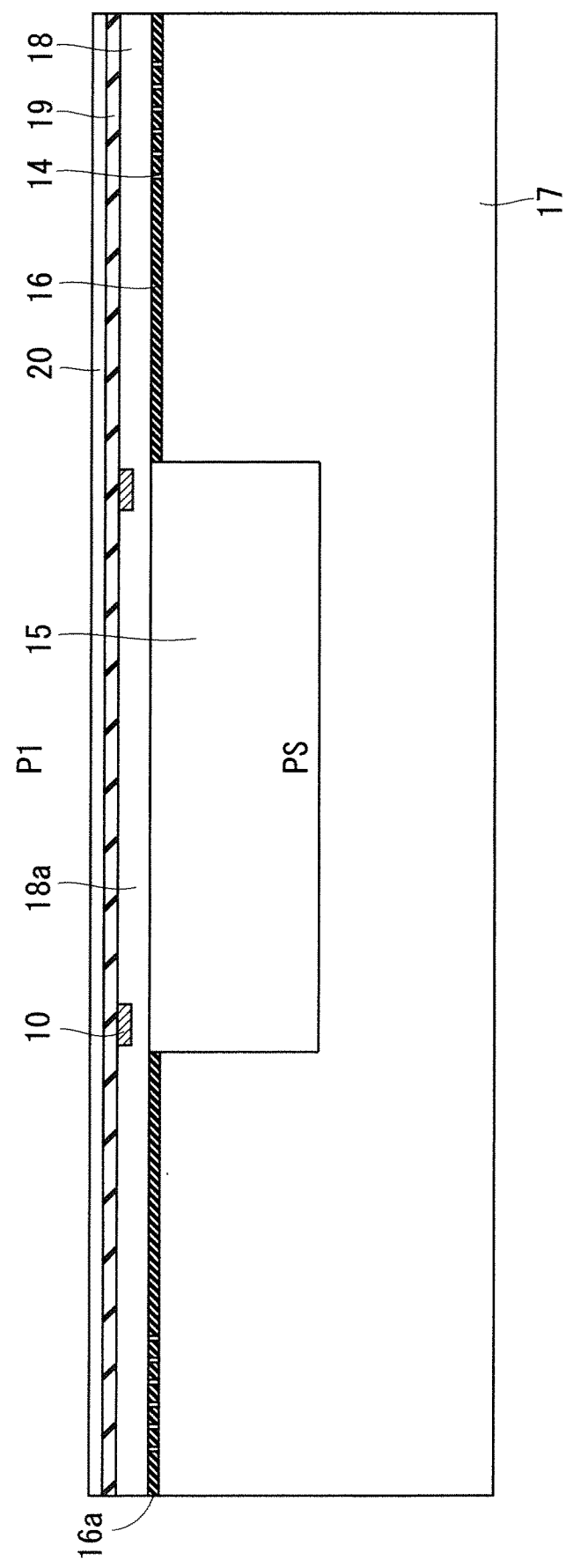
FIG. 8 is a cross-sectional diagram illustrating a part of another example of the configuration of the semiconductor pressure sensor according to the first embodiment.
Figure 9:
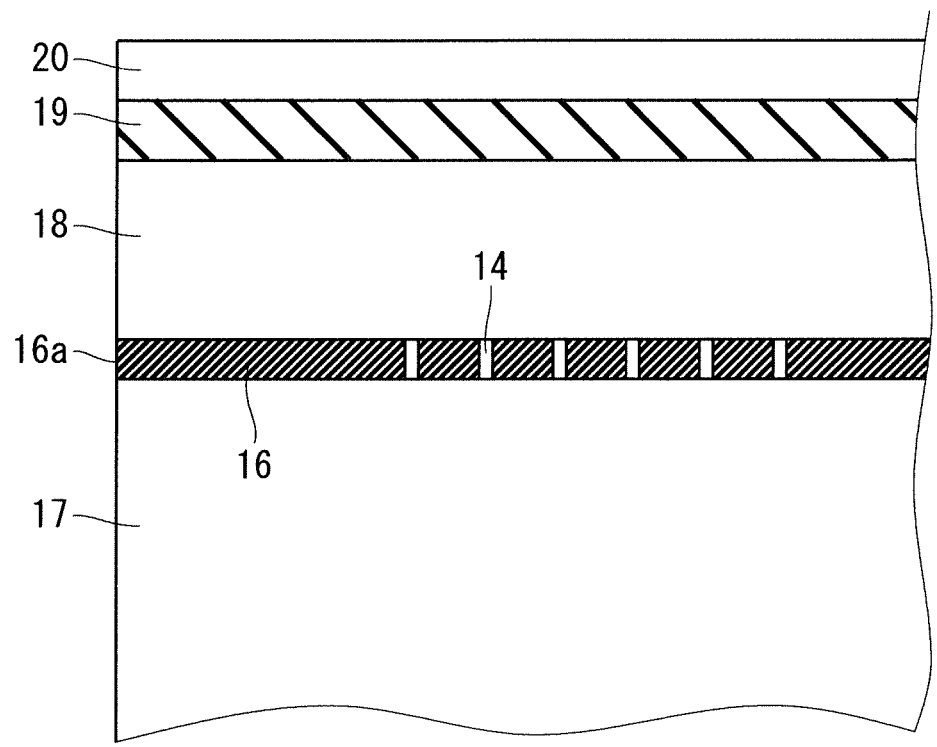
FIG. 9 is a cross-sectional diagram schematically illustrating a part of another example of the configuration of the semiconductor pressure sensor according to the first embodiment.

FIG. 8 is a cross-sectional diagram similar to FIG. 2. FIG. 9 is a cross-sectional diagram similar to FIG. 4, schematically illustrating a cross-sectional configuration of FIG. 8. In the examples of FIG. 8 and FIG. 9, unlike the examples of FIG. 2 and FIG. 4, the first silicon substrate 17 does not include the plurality of second recessed parts, and the first silicon oxide film 16 includes holes surrounding the plurality of second spaces, with which the plurality of permeation gas stagnation chambers 14 are provided. According to the configuration as described above, the first silicon oxide film 16 to serve as a gas permeation path is divided, and thus the permeation gas such as a hydrogen gas can be inhibited from permeating to the pressure reference chamber 15.

Figure 10:
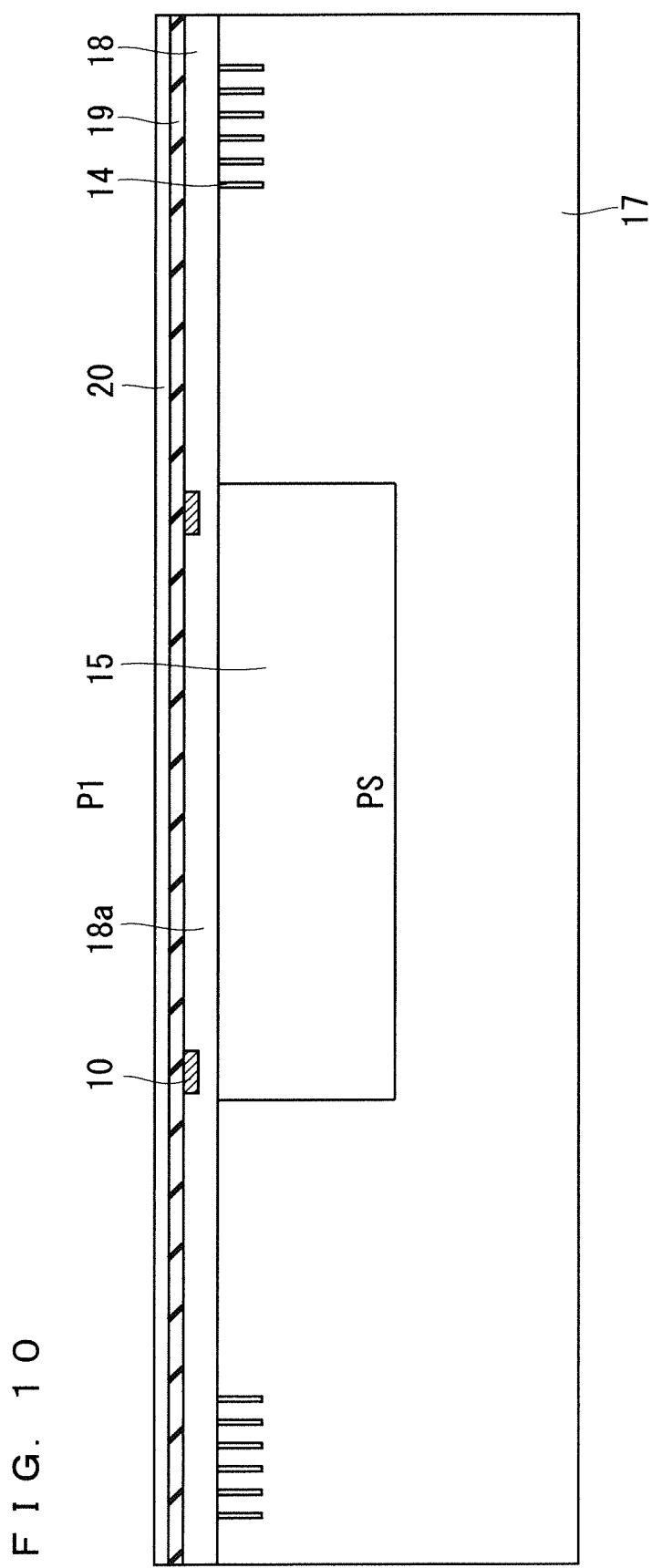
FIG. 10 is a cross-sectional diagram illustrating a part of another example of the configuration of the semiconductor pressure sensor according to the first embodiment.
Figure 11:
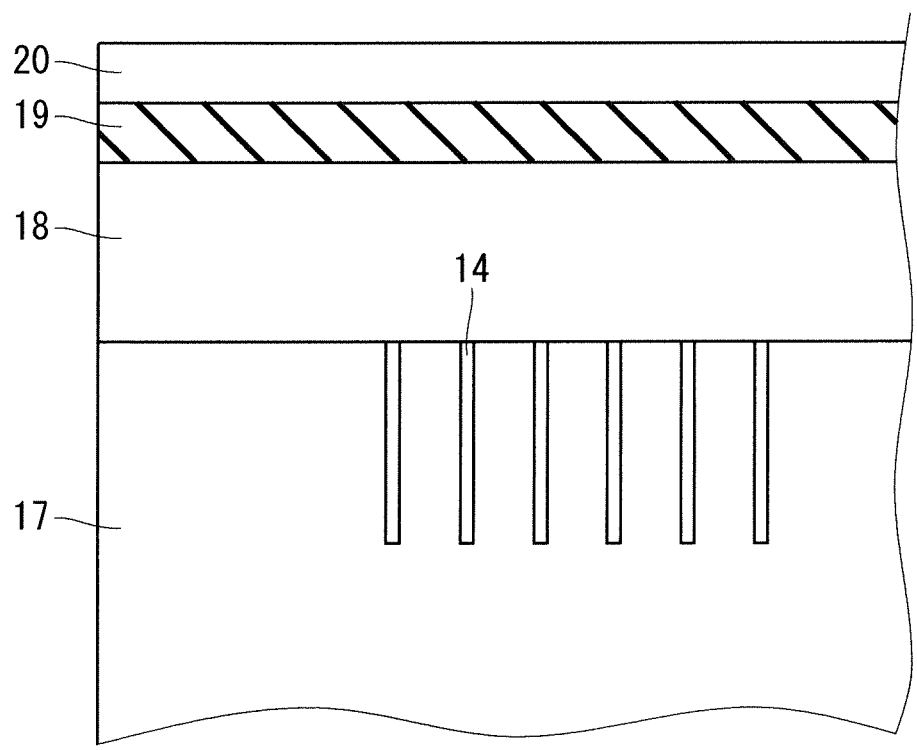
FIG. 11 is a cross-sectional diagram schematically illustrating a part of another example of the configuration of the semiconductor pressure sensor according to the first embodiment.

FIG. 10 is a cross-sectional diagram similar to FIG. 2. FIG. 11 is a cross-sectional diagram similar to FIG. 4, schematically illustrating a cross-sectional configuration of FIG. 10. In the examples of FIG. 10 and FIG. 11, unlike the examples of FIG. 2 and FIG. 4, the first silicon oxide film 16 is not provided, and the first silicon substrate 17 and the second silicon substrate 18 are directly joined to each other. According to the configuration as described above, the manufacturing method becomes slightly complicated as will be described later; however, since there is no first silicon oxide film 16 to serve as a gas permeation path, the permeation gas such as a hydrogen gas can be inhibited from permeating to the pressure reference chamber 15.

<Manufacturing Method>

Figure 12:
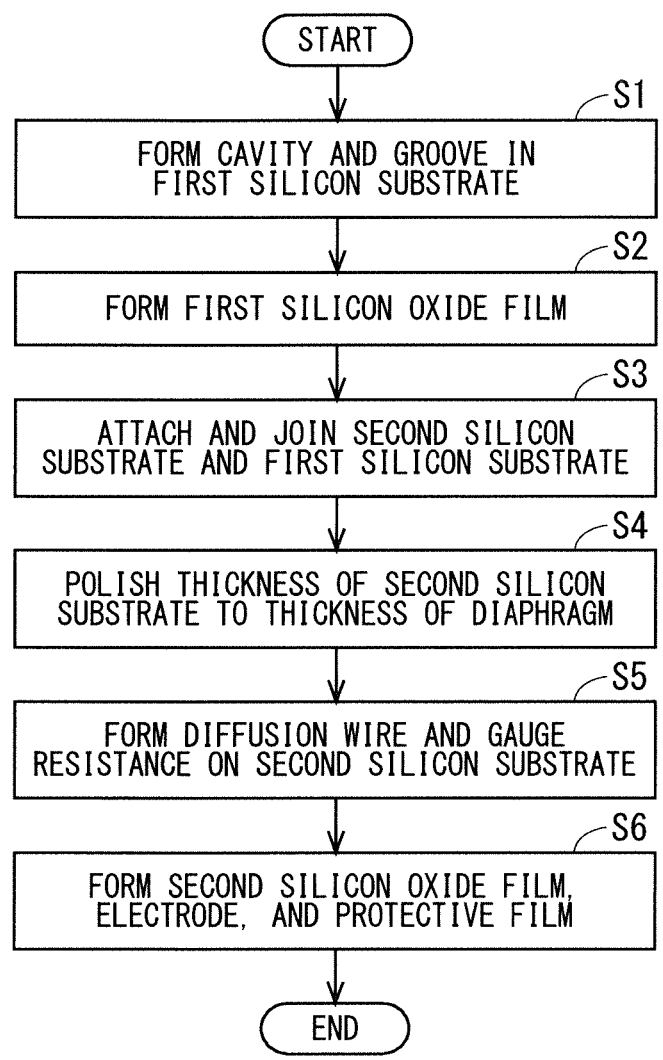
FIG. 12 is a flowchart illustrating a manufacturing method of the semiconductor pressure sensor according to the first embodiment.

FIG. 12 is a flowchart illustrating a manufacturing method of the semiconductor pressure sensor according to the first embodiment. FIG. 13, FIG. 18, FIG. 20, and FIG. 23 are each a plan view illustrating a manufacturing stage of the semiconductor pressure sensor. FIG. 14, FIG. 16, FIG. 17, FIG. 19, FIG. 21, FIG. 22, and FIG. 24 are each a cross-sectional diagram illustrating a manufacturing stage of the semiconductor pressure sensor. FIG. 15 is a cross-sectional diagram schematically illustrating a part of the manufacturing stage of the semiconductor pressure sensor. In the following, the manufacturing method of the semiconductor pressure sensor of FIG. 1 to FIG. 4 will mainly be described, and the manufacturing method of the semiconductor pressure sensor of FIG. 6 to FIG. 12 will be described as appropriate.

Figure 13:
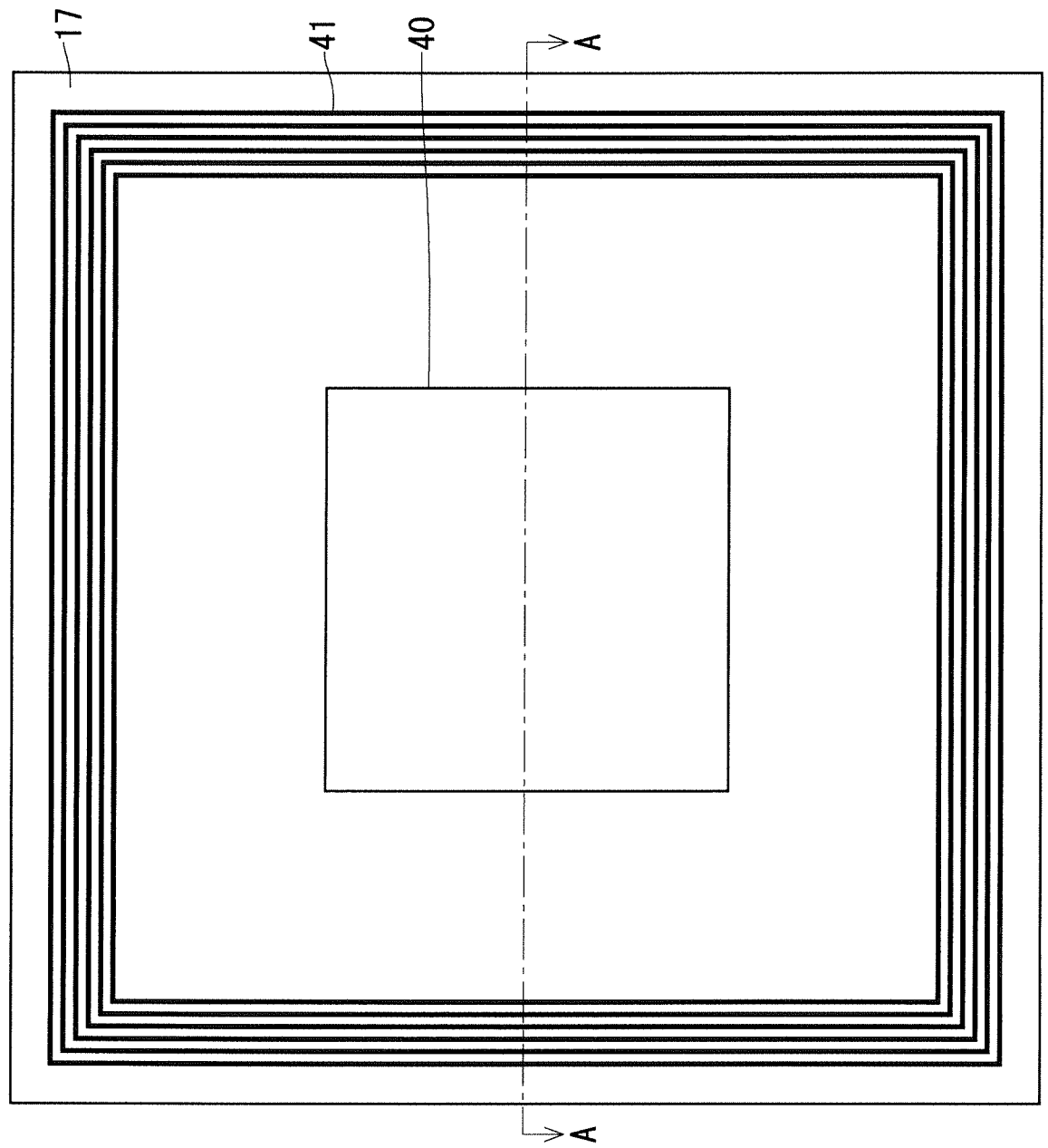
FIG. 13 is a plan view illustrating a manufacturing stage of the semiconductor pressure sensor according to the first embodiment.
Figure 14:
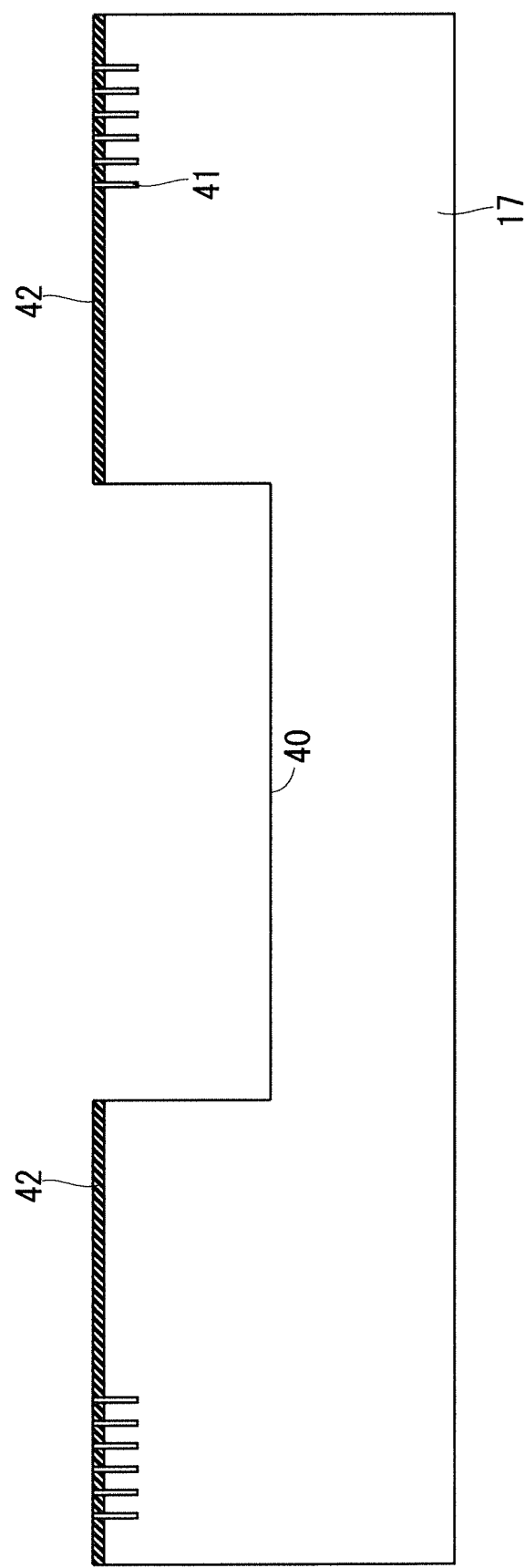
FIG. 14 is a cross-sectional diagram illustrating a manufacturing stage of the semiconductor pressure sensor according to the first embodiment.
Figure 15:
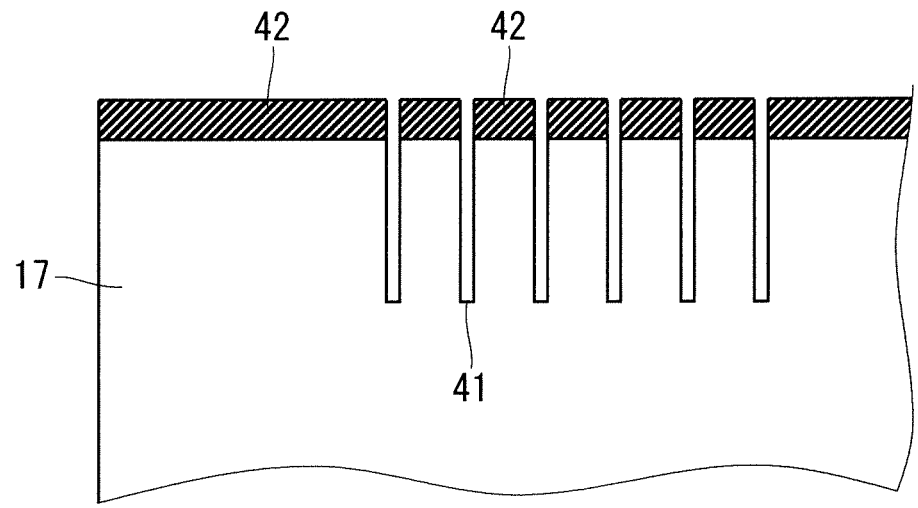
FIG. 15 is a cross-sectional diagram schematically illustrating a part of the manufacturing stage of the semiconductor pressure sensor according to the first embodiment.

First, as illustrated in FIG. 13 to FIG. 15, a silicon oxide film to be an etching mask 42 is formed on the first silicon substrate 17. For example, the first silicon substrate 17 is heated approximately at 700 to 1100° C. in an oxygen atmosphere, and the property of the surface of the first silicon substrate 17 is changed so as to be a silicon oxide film. In this manner, the silicon oxide film to be the etching mask 42 is formed.

Next, photolithographic treatment and etching treatment are performed. In this manner, a cavity 40 being the first recessed part and a plurality of grooves 41 being the plurality of second recessed parts are formed in the first silicon substrate 17 (see Step S1 of FIG. 12). When the second silicon substrate 18 is attached in a post-process, the cavity 40 being a first recessed part forms the pressure reference chamber 15, and the grooves 41 being second recessed parts form the permeation gas stagnation chambers 14.

Note that, in the above description, a silicon oxide film is used as the etching mask 42. However, another film such as a metal film may be used as the etching mask 42. Alternatively, a photoresist film being subjected to photolithographic treatment without being deposited may be directly used as the etching mask 42.

In the above description, the cavity 40 and the grooves 41 are simultaneously subjected to the photolithographic treatment and the etching treatment, and thus have etching depth according to their opening areas. If etching is performed with the depth of the cavity 40 being specified, since the opening areas of the grooves 41 are smaller than the opening area of the cavity 40, the depth of the grooves 41 becomes shallower than the depth of the cavity 40. Note that the depth of the cavity 40 is approximately 10 to 300 μm, for example.

Figure 16:
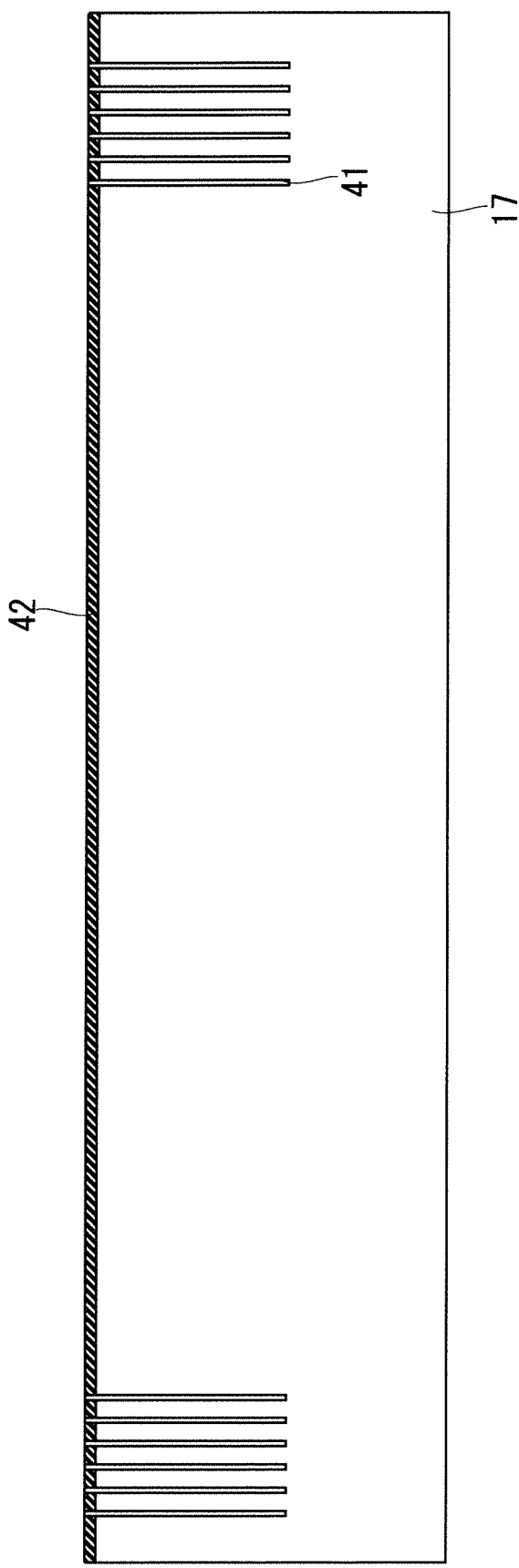
FIG. 16 is a cross-sectional diagram illustrating a manufacturing stage of the semiconductor pressure sensor according to the first embodiment.
Figure 17:
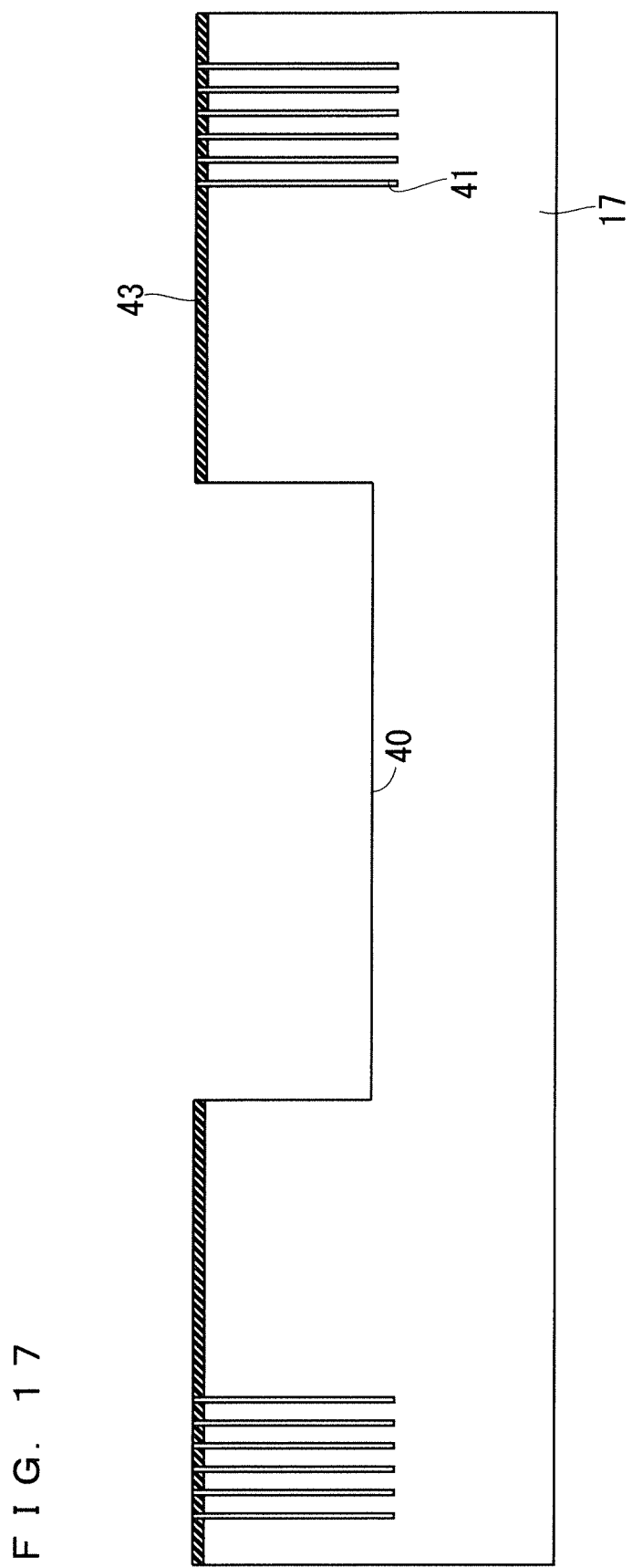
FIG. 17 is a cross-sectional diagram illustrating a manufacturing stage of the semiconductor pressure sensor according to the first embodiment.

To obtain desired depth of the grooves 41, the photolithographic treatment and the etching treatment of the cavity 40 and the grooves 41 may be formed separately for the cavity 40 and the grooves 41. For example, after the grooves 41 having a smaller opening width are formed as illustrated in FIG. 16, the cavity 40 may be formed as illustrated in FIG. 17. In the following, the manufacturing method will be described.

As illustrated in FIG. 16, a film such as a silicon oxide film to be the etching mask 42 is formed on the first silicon substrate 17. Next, photolithographic treatment and etching treatment are performed. In this manner, the grooves 41 being the second recessed parts are formed. When the second silicon substrate 18 is attached to the first silicon substrate 17 in a post-process, the grooves 41 form the permeation gas stagnation chambers 14. Here, the etching depth of the grooves 41 is set based on gas permeation control capability that is required for the permeation gas stagnation chambers 14. The etching depth of the grooves 41 is approximately 50 to 300 μm, for example.

Then, as illustrated in FIG. 17, a film such as a silicon oxide film to be an etching mask 43 is formed on the first silicon substrate 17. Next, photolithographic treatment and etching treatment are performed. In this manner, the cavity 40 being the first recessed part is formed. When the second silicon substrate 18 is attached to the first silicon substrate 17 in a post-process, the cavity 40 forms the pressure reference chamber 15. The etching mask 43 may be formed after the etching mask 42 is removed, or may be formed on the etching mask 42 in an overlapping manner. The etching depth of the cavity 40 is approximately 50 to 300 μm, for example.

When the cavity 40 and the grooves 41 are formed in different processes as described above, the etching mask 42 and the etching depth can be made suitable. Thus, by forming the grooves 41 to be deep, the chip size can be made less liable to be increased, and the permeation speed of the permeation gas in the permeation gas stagnation chambers 14 can be reduced.

Figure 18:
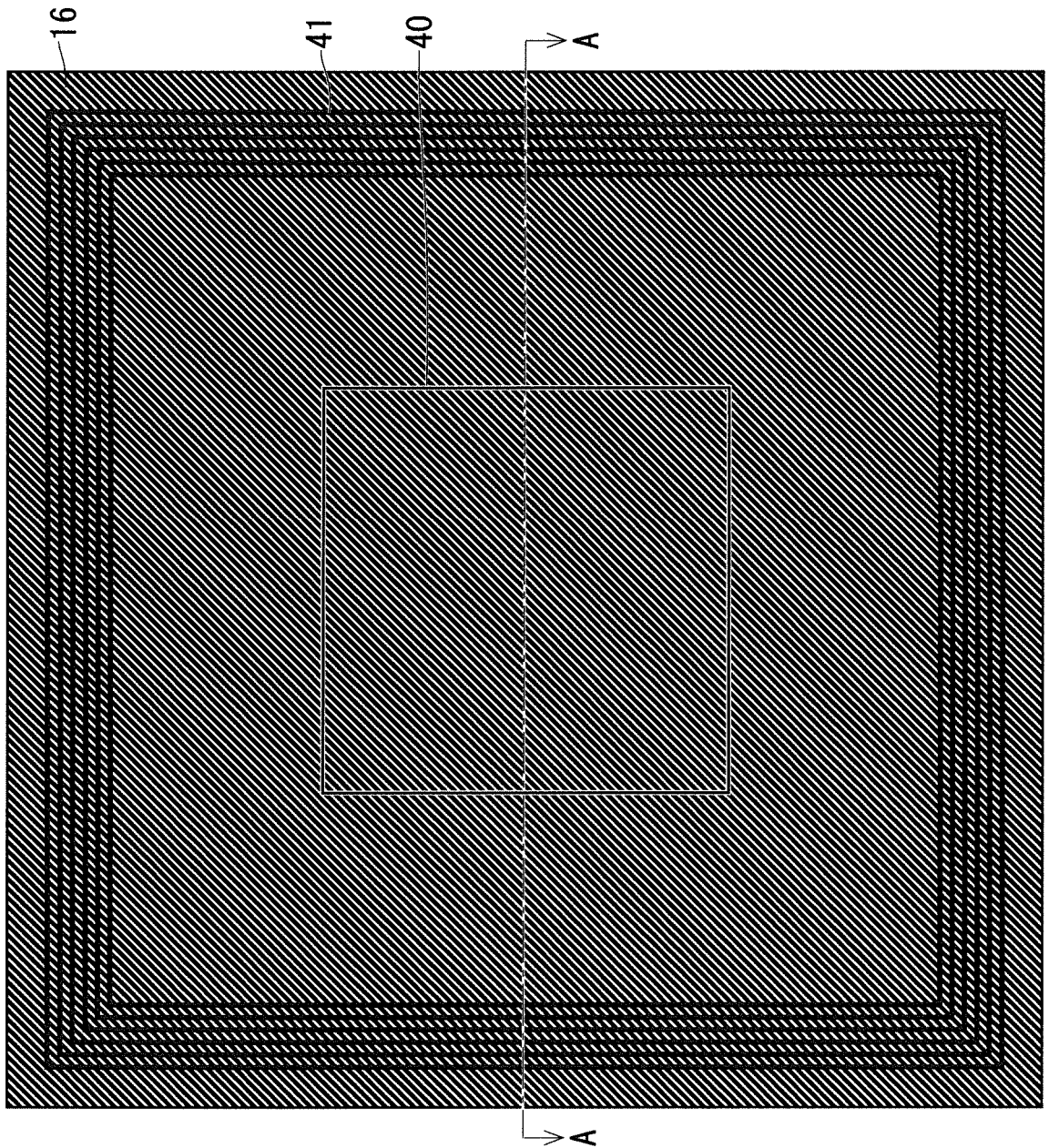
FIG. 18 is a plan view illustrating a manufacturing stage of the semiconductor pressure sensor according to the first embodiment.
Figure 19:
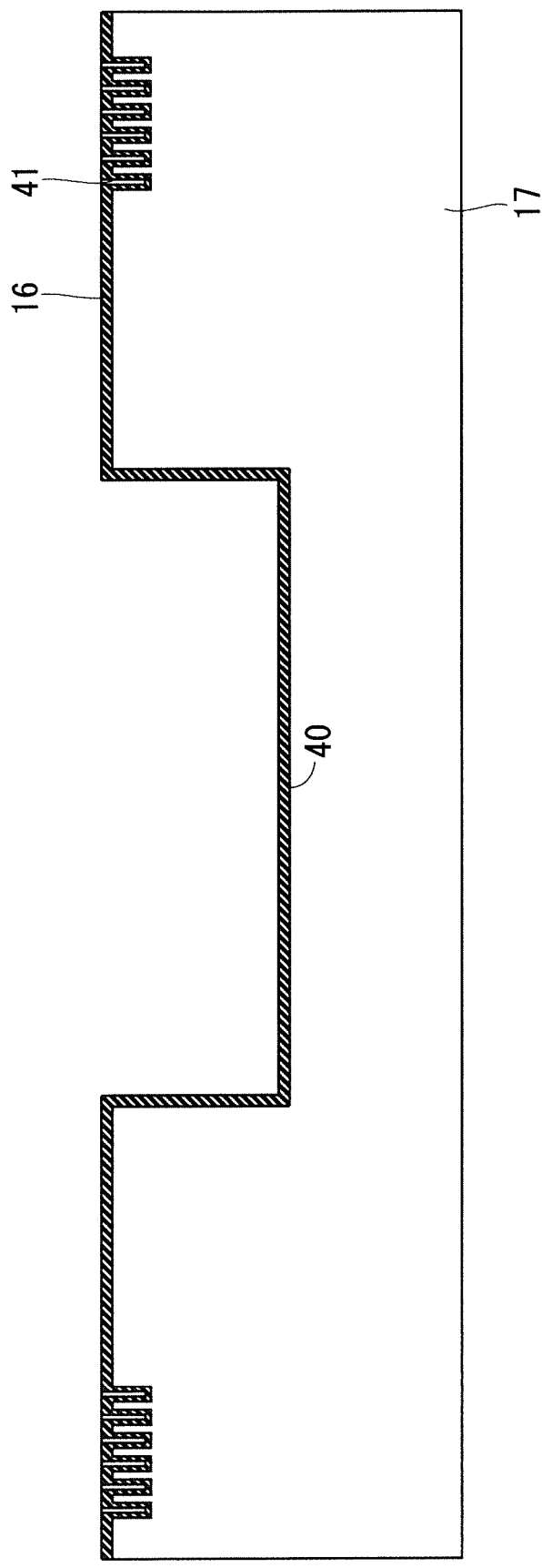
FIG. 19 is a cross-sectional diagram illustrating a manufacturing stage of the semiconductor pressure sensor according to the first embodiment.

Next, as illustrated in FIG. 18 and FIG. 19, the etching mask 42 and the like are removed, and oxidation is performed so as to cover the surface of the cavity 40 and the surface of the grooves 41. In this manner, the first silicon oxide film 16 is formed (see Step S2 of FIG. 12). The thickness of the first silicon oxide film 16 is approximately 0.1 to 5 μm, for example. It is desirable that the first silicon oxide film 16 has such a thickness that enables stable joining between the first silicon substrate 17 and the second silicon substrate 18 performed in a post-process, and also has a thickness as small as possible in view of the fact that the permeation speed of the permeation gas in the first silicon oxide film 16 is relatively high.

Note that, in the above description, the first silicon oxide film 16 is formed after the etching mask 42 is removed. However, this is not restrictive. For example, when the etching mask 42 for forming the cavity 40 and the grooves 41 is a silicon oxide film, the etching mask 42 may be left as it is, so as to be used as the first silicon oxide film 16. In this case, the configuration of FIG. 6 and FIG. 7 can be manufactured.

Further, the first silicon substrate 17 and the second silicon substrate 18 may be directly joined to each other in a joining process being a post-process without forming the first silicon oxide film 16 after removing the etching mask 42. In this case, the configuration of FIG. 10 and FIG. 11 can be manufactured. Note that such silicon direct joining has disadvantages in that dedicated facility is required, and control is difficult because a state of a joining surface has great influence, for example.

Figure 20:
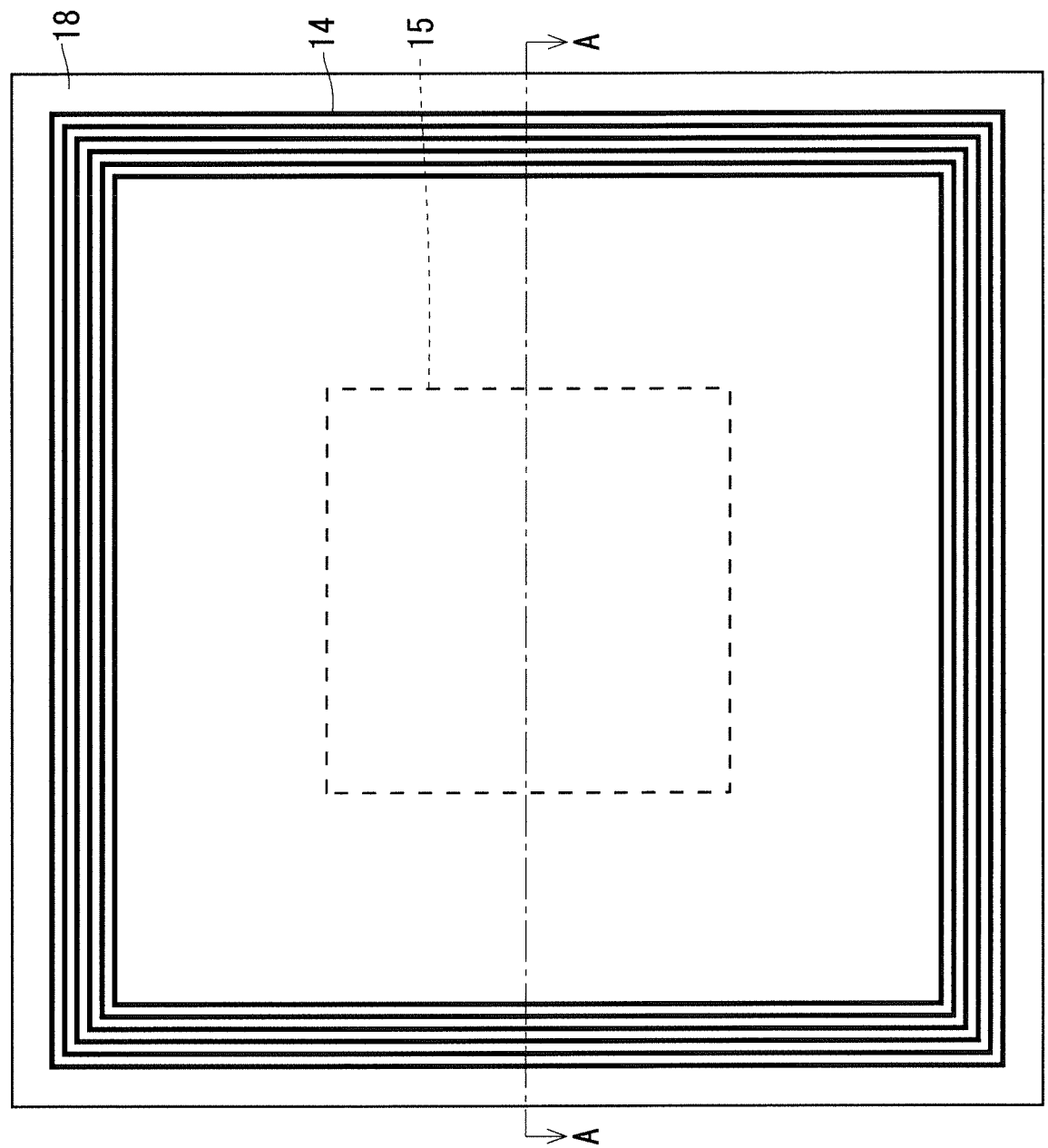
FIG. 20 is a plan view illustrating a manufacturing stage of the semiconductor pressure sensor according to the first embodiment.
Figure 21:
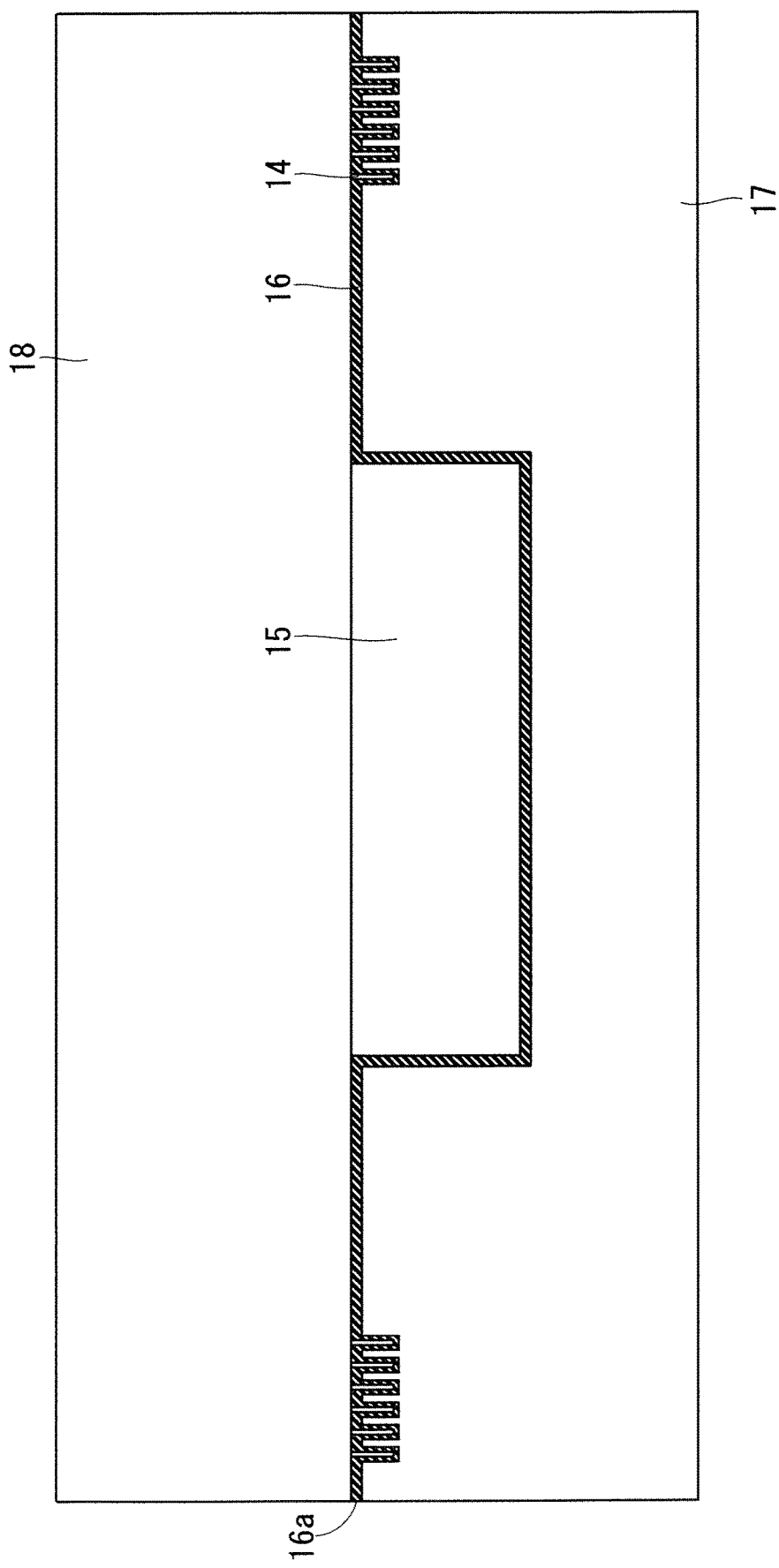
FIG. 21 is a cross-sectional diagram illustrating a manufacturing stage of the semiconductor pressure sensor according to the first embodiment.

Next, as illustrated in FIG. 20 and FIG. 21, the second silicon substrate 18 and the first silicon substrate 17 are attached with the first silicon oxide film 16 being interposed therebetween, and are joined together through thermal treatment (see Step S3 of FIG. 12). With this, the cavity 40 being a first recessed part forms the pressure reference chamber 15, and the grooves 41 being second recessed parts form the permeation gas stagnation chambers 14. When the joining is performed under a vacuum atmosphere, the pressure reference chamber 15 becomes a vacuum chamber. This makes the vacuum pressure PS inside the pressure reference chamber 15 being a vacuum chamber serve as a reference pressure for the external pressure P1 applied to the diaphragm 18a. Similarly, the permeation gas stagnation chambers 14 also become vacuum chambers, and a pressure difference between the permeation gas stagnation chambers 14 located adjacent to each other is eliminated. Thus, the permeation gas stagnation chambers 14 become able to have the permeation gas stagnate therein until the pressure of the permeation gas stagnation chambers 14 rises to a certain pressure due to the permeation gas such as hydrogen.

Figure 22:
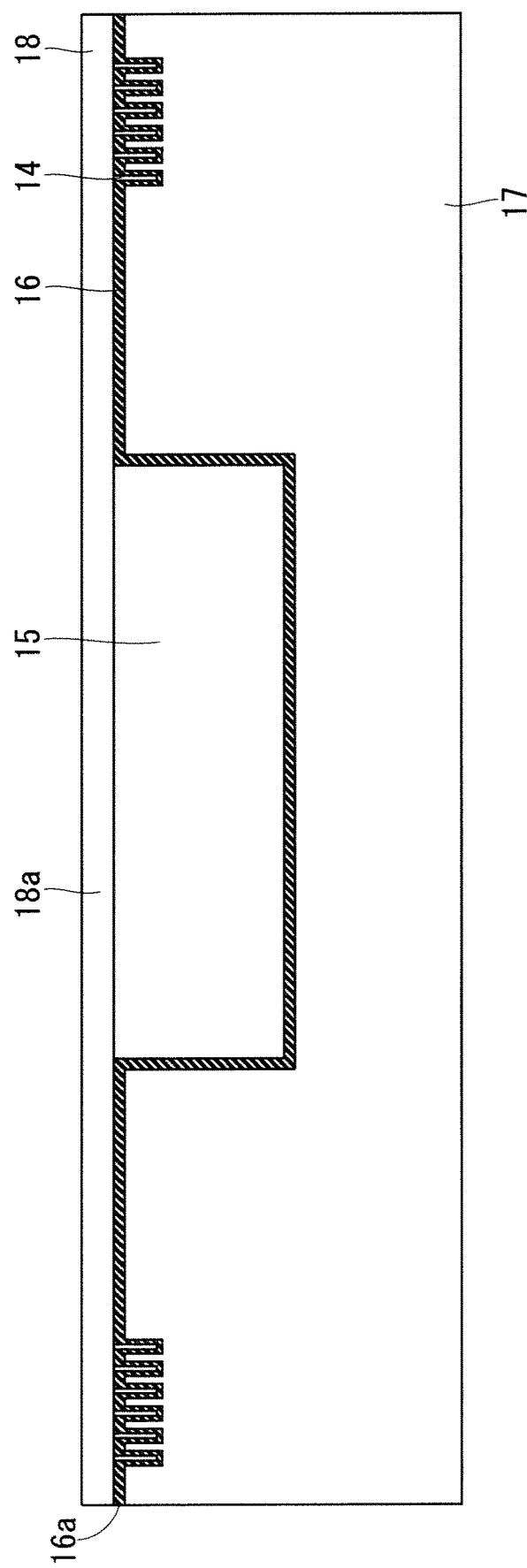
FIG. 22 is a cross-sectional diagram illustrating a manufacturing stage of the semiconductor pressure sensor according to the first embodiment.

Next, as illustrated in FIG. 22, the thickness of the second silicon substrate 18 is polished to obtain a desired thickness of the diaphragm 18a (see Step S4 of FIG. 12). With this, a part of the second silicon substrate 18 above the pressure reference chamber 15 functions as the diaphragm 18a. By adjusting the thickness of the diaphragm 18a, detection sensitivity with respect to pressure can be controlled.

Figure 23:
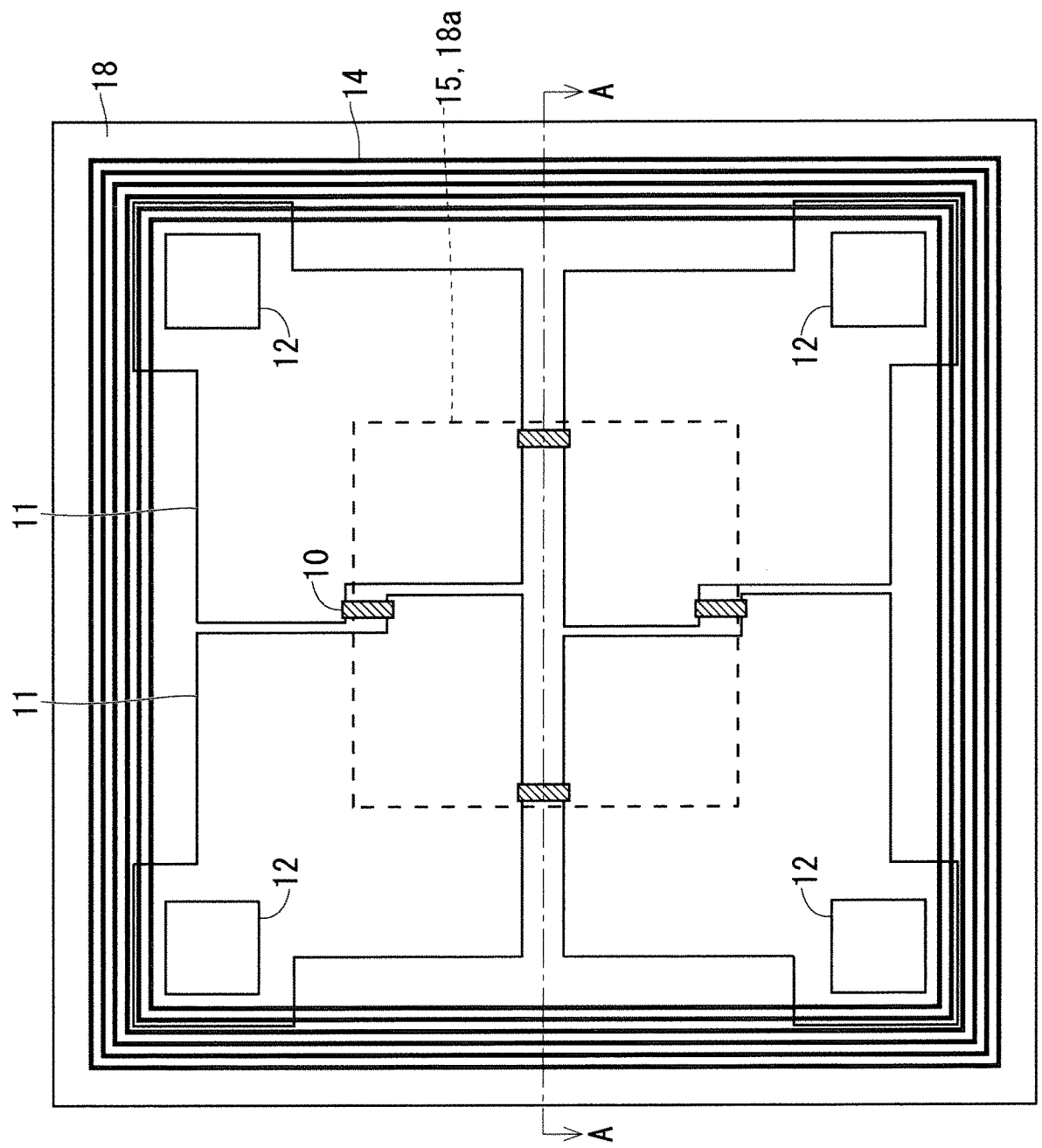
FIG. 23 is a plan view illustrating a manufacturing stage of the semiconductor pressure sensor according to the first embodiment.
Figure 24:
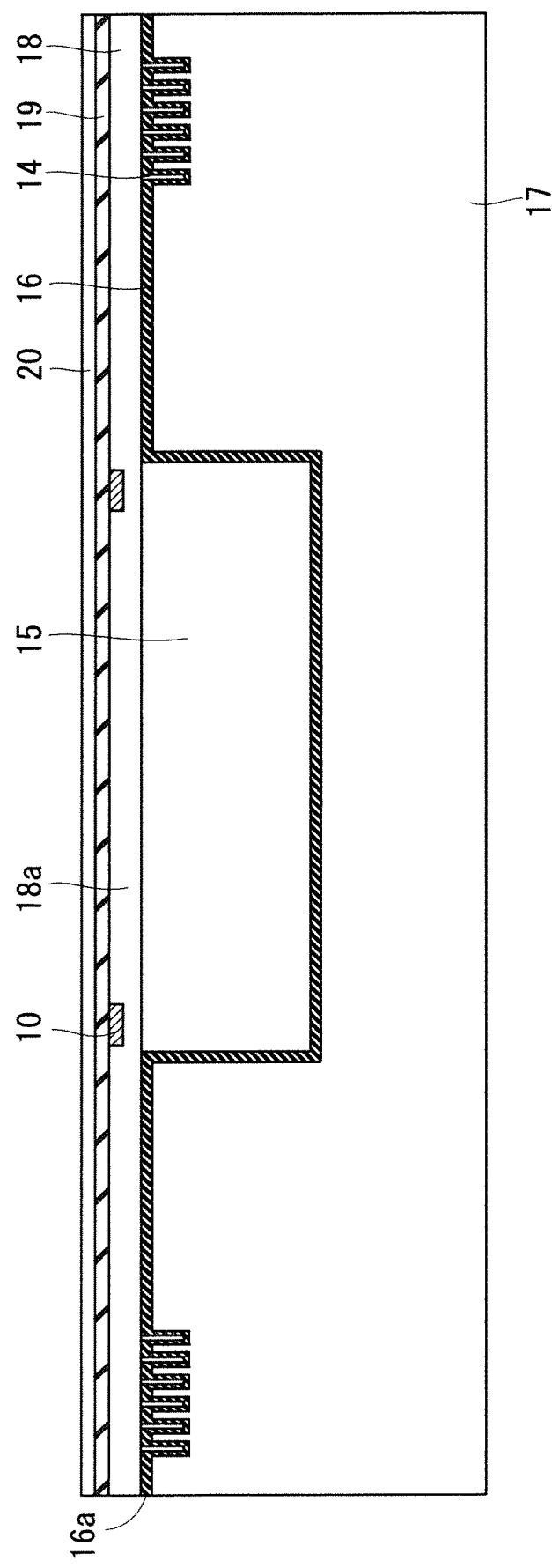
FIG. 24 is a cross-sectional diagram illustrating a manufacturing stage of the semiconductor pressure sensor according to the first embodiment.

Next, as illustrated in FIG. 23 and FIG. 24, oxidation treatment and photolithographic treatment are performed, and then impurity injection, annealing treatment, and oxidation treatment are performed. In this manner, the diffusion wires 11 are formed on the second silicon substrate 18 (see Step S5 of FIG. 12). The diffusion wires 11 are wires of low resistance for forming a Wheatstone bridge including the gauge resistances 10. For example, by setting concentration of impurity to be injected to approximately 5e14 to 5e15 ions/cm$^2$, and setting annealing temperature to approximately 1000 to 1100° C., and performing oxidation treatment of approximately 100 to 500 nm, a diffusion layer of low resistance having a diffusion depth of approximately 2 to 5 μm is formed as the diffusion wires 11.

Next, similarly, oxidation treatment and photolithographic treatment are performed, and then impurity injection and annealing treatment are performed. In this manner, the gauge resistances 10 connected to the diffusion wires 11 are formed on the four sides of the diaphragm 18a (see Step S5 of FIG. 12). With this, the Wheatstone bridge including the gauge resistances 10 is formed. For example, the concentration of impurity to be injected at the time of formation of the gauge resistances 10 is approximately 1e13 to 1e14 ions/cm$^2$. When the impurity concentration of the gauge resistances 10 is set low, sensitivity with respect to pressure change becomes high but temperature characteristics deteriorate. Accordingly, the impurity concentration is set to optimal concentration in view of a trade-off between sensitivity and temperature characteristics.

In the first embodiment, the oxide films deposited when the diffusion wires 11 and the gauge resistances 10 are formed are all removed, and subsequently, the second silicon oxide film 19 is formed on the upper surface of the second silicon substrate 18 (see Step S6 of FIG. 12). With this, the second silicon oxide film 19 on the upper surface of the diaphragm 18a becomes flat, and deformation characteristics of the diaphragm 18a with respect to pressure change can be enhanced. On the second silicon oxide film 19, a phosphorus silicon glass (PSG) film or a boro-phospho silicate glass (BPSG) film may be deposited as a passivation film (not shown).

Next, in order to enable extraction of an electrical signal from the diffusion wires 11 to the outside, photolithographic treatment and etching treatment are performed, and contact holes for exposing the diffusion wires 11 are formed on the second silicon oxide film 19. Then, after a metal film such as AlSi, AlCu, Al, and AlSiCu is deposited on the surface, photolithographic treatment and etching treatment are performed, and the electrodes 12 are formed in the contact holes (see Step S6 of FIG. 12). Next, after a nitride film is deposited on the entire surface as the protective film 20 by means of plasma chemical vapor deposition (CVD), for example, photolithographic treatment and etching treatment are performed (see Step S6 of FIG. 12). With this, the second silicon substrate 18 except desired parts such as the electrodes 12 and the like are protected by the protective film 20.

The semiconductor pressure sensor manufactured through the above process is an absolute pressure sensor in which the vacuum pressure PS of the pressure reference chamber 15 is a reference pressure for the external pressure P1 applied to the upper surface of the diaphragm 18a.

Gist of First Embodiment

According to the semiconductor pressure sensor of the first embodiment as described above, in cross-section, the plurality of permeation gas stagnation chambers 14 are hermetically sealed in a state of being separated away from the pressure reference chamber 15 between the first silicon substrate 17 and the second silicon substrate 18, and are provided in one of or each of a first end side and a second end side of the pressure reference chamber 15. According to the configuration as described above, the permeation gas such as hydrogen can be inhibited from permeating to the pressure reference chamber 15 without causing increase in the chip size, and therefore variation in characteristics of the semiconductor pressure sensor can be reduced. In addition, according to the manufacturing method of the semiconductor pressure sensor of the first embodiment, the semiconductor pressure sensor having high reliability with respect to a permeation gas such as hydrogen can be manufactured in a simple manufacturing process at low costs.

Note that the embodiment can be deformed and omitted as appropriate.

While the disclosure has been shown and described in detail, the foregoing description is in all aspects illustrative and not restrictive. It is therefore understood that numerous modifications and variations can be devised.

What is claimed is:

1. A semiconductor pressure sensor comprising:
a first silicon substrate including a first recessed part;
a second silicon substrate including a diaphragm covering a first space in the first recessed part, the second silicon substrate being configured to hermetically seal the first space; and
a gauge resistance configured to output a deformation amount of the diaphragm by using electrical characteristics, wherein
a plurality of second spaces are hermetically sealed in a state of being separated away from the first space between the first silicon substrate and the second silicon substrate, and
the plurality of second spaces are provided in only one of a first end side or a second end side of the first space, or the plurality of second spaces includes a first plurality of second spaces provided in the first end side and a second plurality of second spaces provided in the second end side,
the plurality of second spaces being hermetically sealed such that hydrogen gas permeating toward the first space would fill the plurality of second spaces before permeating into the first space,
the first silicon substrate includes a plurality of second recessed parts surrounding the plurality of second spaces,
the semiconductor pressure sensor further comprises a silicon oxide film being not provided on a side surface and a bottom surface of the plurality of second recessed parts and being connected to the first silicon substrate and the second silicon substrate,
the second silicon substrate includes a lower surface that comprises the diaphragm, and
the lower surface of the second silicon substrate is an upper surface of the plurality of second spaces.

2. The semiconductor pressure sensor according to claim 1, wherein
in plan view, the plurality of second spaces are disposed in a concentric pattern about the first space.

3. The semiconductor pressure sensor according to claim 2, wherein
each of the plurality of second spaces is discontinuously disposed along a circumferential direction of the concentric pattern, and
discontinuous parts of the plurality of second spaces in a first circle and discontinuous parts of the plurality of second spaces in a second circle adjacent to the first circle are alternately disposed along the circumferential direction.

4. The semiconductor pressure sensor according to claim 1, wherein
the silicon oxide film includes holes surrounding the plurality of second spaces.

5. The semiconductor pressure sensor according to claim 1, wherein
the second silicon substrate includes a lower surface that comprises the diaphragm, and
the lower surface of the second silicon substrate is an upper surface of the plurality of second spaces.

6. A semiconductor pressure sensor comprising:
a first silicon substrate including a first recessed part;
a second silicon substrate including a diaphragm covering a first space in the first recessed part, the second silicon substrate being configured to hermetically seal the first space; and
a gauge resistance configured to output a deformation amount of the diaphragm by using electrical characteristics, wherein
a plurality of second spaces are hermetically sealed in a state of being separated away from the first space between the first silicon substrate and the second silicon substrate,
the plurality of second spaces are provided in only one of a first end side or a second end side of the first space, or the plurality of second spaces includes a first plurality of second spaces provided in the first end side and a second plurality of second spaces provided in the second end side, and
a distance between the plurality of second spaces and a side surface of the first silicon substrate is smaller than a distance between the plurality of second spaces and the first recessed part,
the first silicon substrate includes a plurality of second recessed parts surrounding the plurality of second spaces, the semiconductor pressure sensor further comprises a silicon oxide film being not provided on a side surface and a bottom surface of the plurality of second recessed parts and being connected to the first silicon substrate and the second silicon substrate, the second silicon substrate includes a lower surface that comprises the diaphragm, and the lower surface of the second silicon substrate is an upper surface of the plurality of second spaces.

7. The semiconductor pressure sensor according to claim 1, wherein in plan view, the plurality of second spaces are disposed in a concentric pattern about the first space, each of the plurality of second spaces is discontinuously disposed along a circumferential direction of the concentric pattern, discontinuous parts of the plurality of second spaces in a first circle and discontinuous parts of the plurality of second spaces in a second circle adjacent to the first circle are alternately disposed along the circumferential direction.

8. The semiconductor pressure sensor according to claim 6, wherein in plan view, the plurality of second spaces are disposed in a concentric pattern about the first space, each of the plurality of second spaces is discontinuously disposed along a circumferential direction of the concentric pattern, discontinuous parts of the plurality of second spaces in a first circle and discontinuous parts of the plurality of second spaces in a second circle adjacent to the first circle are alternately disposed along the circumferential direction.

* * * * *